United States Patent
Seok

(10) Patent No.: US 10,327,226 B2
(45) Date of Patent: Jun. 18, 2019

(54) METHOD AND APPARATUS FOR RESOURCE ALLOCATION FOR MULTIPLE USER TRANSMISSION IN A HIGH EFFICIENCY WIRELESS LAN

(71) Applicant: NEWRACOM, Inc., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 119 days.

(21) Appl. No.: 14/965,701

(22) Filed: Dec. 10, 2015

(65) Prior Publication Data

US 2016/0174200 A1 Jun. 16, 2016

Related U.S. Application Data

(60) Provisional application No. 62/093,251, filed on Dec. 17, 2014, provisional application No. 62/091,364, filed on Dec. 12, 2014.

(51) Int. Cl.
| | |
|---|---|
| *H04L 5/00* | (2006.01) |
| *H04W 72/04* | (2009.01) |
| *H04B 7/0452* | (2017.01) |
| *H04L 27/26* | (2006.01) |
| *H04W 84/12* | (2009.01) |

(52) U.S. Cl.
CPC .......... *H04W 72/04* (2013.01); *H04B 7/0452* (2013.01); *H04L 5/0023* (2013.01); *H04L 5/0037* (2013.01); *H04L 5/0053* (2013.01); *H04L 5/0092* (2013.01); *H04L 5/0094* (2013.01); *H04L 27/2613* (2013.01); *H04L 5/0048* (2013.01); *H04W 84/12* (2013.01)

(58) Field of Classification Search
CPC ............... H04W 72/04; H04W 72/044; H04W 72/0453; H04W 72/046; H04W 84/12; H04L 27/2613; H04L 5/0023; H04L 5/003; H04L 5/0035; H04L 5/0037; H04L 5/0048–0053; H04L 5/0092; H04L 5/0094; H04L 5/0096; H04B 7/0452
See application file for complete search history.

(56) References Cited

U.S. PATENT DOCUMENTS

| | | | |
|---|---|---|---|
| 2017/0019916 A1* | 1/2017 | Azizi | H04W 72/1278 |
| 2017/0048865 A1* | 2/2017 | Choi | H04L 5/00 |
| 2017/0303280 A1* | 10/2017 | Chun | H04W 72/0453 |

* cited by examiner

*Primary Examiner* — Joshua Kading
(74) *Attorney, Agent, or Firm* — Nicholson De Vos Webster & Elliott LLP

(57) ABSTRACT

Methods and apparatus for resource allocation for multiple user transmission in a High Efficiency WLAN (HEW) are described. An embodiment is a method for transmitting a Physical layer Protocol Data Unit (PPDU) by an access point (AP) to a plurality of stations (STAs). The method may include transmitting, to the plurality of STAs, a preamble including a High-Efficiency SIGNAL (HE-SIG) field, an HE-Short Training Field (HE-STF) field and an HE-Long Training Field (HE-LTF) field in the PPDU on a transmission channel; and transmitting, on the transmission channel, a data field including a group addressed frame transmitted in a first subchannel among a plurality of subchannels into which the transmission channel is divided.

10 Claims, 30 Drawing Sheets

FIG. 11

| L-STF | L-LTF | L-SIG | HE-SIG-A | HE-STF | HE-LTF | HE-LTF | HE-LTF | HE-LTF | HE-SIG-B | PSDU(AP to STA6) |
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3, STA4) |
| | | | | HE-STF | HE-LTF | HE-LTF | HE-LTF | HE-LTF | HE-SIG-B | PSDU(AP to STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(AP to STA6) |
| | | | | HE-STF | HE-LTF | HE-SIG-B | HE-LTF | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-LTF | HE-SIG-C | PSDU(AP to STA1, STA2) |

| L-STF | L-LTF | L-SIG | HE-SIG-A | HE-STF | HE-LTF | HE-LTF | HE-LTF | ... | HE-LTF | HE-SIG-B | PSDU(AP to STA2) |
| | | | | HE-STF | HE-LTF | HE-LTF | HE-LTF | ... | HE-LTF | HE-SIG-B | PSDU(AP to STA1) |
| | | | | HE-STF | HE-LTF | HE-LTF | HE-LTF | ... | HE-LTF | HE-SIG-B | PSDU(AP to Multicast Address 2) |
| | | | | HE-STF | HE-LTF | HE-LTF | HE-LTF | ... | HE-LTF | HE-SIG-B | PSDU(AP to Multicast Address 1) |

| L-STF | L-LTF | L-SIG | HE-SIG-A SAS field={0,0,0,0} | HE-STF | HE-LTF | HE-SIG-B | HE-LTF | ... | HE-LTF | HE-SIG-C | PSDU (5MHz) |
| | | | | HE-STF | HE-LTF | HE-SIG-B | HE-LTF | ... | HE-LTF | HE-SIG-C | PSDU (5MHz) |
| | | | | HE-STF | HE-LTF | HE-SIG-B | HE-LTF | ... | HE-LTF | HE-SIG-C | PSDU (5MHz) |
| | | | | HE-STF | HE-LTF | HE-SIG-B | HE-LTF | ... | HE-LTF | HE-SIG-C | PSDU (5MHz) |
| L-STF | L-LTF | L-SIG | HE-SIG-A SAS field={0,0,1} | HE-STF | HE-LTF | HE-SIG-B | HE-LTF | ... | HE-LTF | HE-SIG-C | PSDU (10MHz) |
| | | | | HE-STF | HE-LTF | HE-SIG-B | HE-LTF | | | | |
| | | | | HE-STF | HE-LTF | HE-SIG-B | HE-LTF | ... | HE-LTF | HE-SIG-C | PSDU (5MHz) |
| | | | | HE-STF | HE-LTF | HE-SIG-B | HE-LTF | ... | HE-LTF | HE-SIG-C | PSDU (5MHz) |

METHOD AND APPARATUS FOR RESOURCE ALLOCATION FOR MULTIPLE USER TRANSMISSION IN A HIGH EFFICIENCY WIRELESS LAN

CROSS-REFERENCE TO RELATED APPLICATIONS

This application claims the benefits of U.S. Provisional Application No. 62/091,364, filed on Dec. 12, 2014, and U.S. Provisional Application No. 62/093,251, filed on Dec. 17, 2014, which are hereby incorporated by reference as if fully set forth herein.

BACKGROUND

Technical Field

The present disclosure relates to Wireless Local Area Networks (WLANs), and more particularly, to a method and apparatus for resource allocation for multiple user transmission in a High Efficiency WLAN (HEW).

Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, there is no specified method for resource allocation for multiple user transmission in a HEW.

SUMMARY

The present disclosure describes embodiments of a method and apparatus for resource allocation for multiple user transmission in a HEW.

The embodiments contemplated by the present disclosure are not limited to the foregoing descriptions, and additional embodiments will become apparent to those having ordinary skill in the pertinent art to the present disclosure based upon the following descriptions.

In an aspect of the present disclosure, a method for transmitting a Physical layer Protocol Data Unit (PPDU) by an access point (AP) to a plurality of stations (STAs) may be provided. The method may include transmitting, to the plurality of STAs, a preamble including a High-Efficiency SIGNAL (HE-SIG) field, an HE-Short Training Field (HE-STF) field and an HE-Long Training Field (HE-LTF) field in the PPDU on a transmission channel; and transmitting, on the transmission channel, a data field including a group addressed frame transmitted in a first subchannel among a plurality of subchannels into which the transmission channel is divided.

In another aspect of the present disclosure, a method for receiving a PPDU by a STA from an AP may be provided. The method may include receiving, from the AP, a preamble including an HE-SIG field, an HE-STF field and an HE-LTF field in the PPDU on a transmission channel; and receiving, from the AP, a group addressed frame transmitted in a first subchannel among a plurality of subchannels into which the transmission channel is divided, the group addressed frame included in a data field transmitted by the AP on the transmission channel.

In another aspect of the present disclosure, an AP apparatus for transmitting a PPDU to a plurality of STAs may be provided. The AP apparatus may include a baseband processor, a Radio Frequency (RF) transceiver, a memory, etc. The baseband processor may be configured to transmit, using the RF transceiver, to the plurality of STAs, a preamble including an HE-SIG field, an HE-STF field and an HE-LTF field in the PPDU on a transmission channel; and transmit, using the RF transceiver, on the transmission channel, a data field including a group addressed frame transmitted in a first subchannel among a plurality of subchannels into which the transmission channel is divided.

In another aspect of the present disclosure, a STA apparatus for receiving a PPDU by a STA from an AP may be provided. The STA apparatus may include a baseband processor, an RF transceiver, a memory, etc. The baseband processor may be configured to receive, using the RF transceiver, from the AP, a preamble including an HE-SIG field, an HE-STF field and an HE-LTF field in the PPDU on a transmission channel; and receive, using the RF transceiver, from the AP, a group addressed frame transmitted in a first subchannel among a plurality of subchannels into which the transmission channel is divided, the group addressed frame included in a data field transmitted by the AP on the transmission channel.

In another aspect of the present disclosure, a non-transitory computer-readable medium having instructions executable for a STA to transmit a PPDU to a plurality of STAs may be provided. The executable instructions may cause the STA to transmit, to the plurality of STAs, a preamble including an HE-SIG field, an HE-STF field and an HE-LTF field in the PPDU on a transmission channel; and transmit, on the transmission channel, a data field including a group addressed frame transmitted in a first subchannel among a plurality of subchannels into which the transmission channel is divided.

In another aspect of the present disclosure, a non-transitory computer-readable medium having instructions executable for an AP to receive a PPDU by a STA from an AP may be provided. The executable instructions may cause the AP to receive, from the AP, a preamble including an HE-SIG field, an HE-STF field and an HE-LTF field in the PPDU on a transmission channel; and receive, from the AP, a group addressed frame transmitted in a first subchannel among a plurality of subchannels into which the transmission channel is divided, the group addressed frame included in a data field transmitted by the AP on the transmission channel.

It is to be understood that the foregoing summarized features are exemplary aspects of the following detailed description of the present disclosure and are not intended to limit the scope of the present disclosure.

According to the present disclosure, a method for resource allocation for multiple user transmission in a HEW can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of a High Efficiency Long Training Field (HE-LTF) field in an HE PPDU frame format according to the present disclosure;

FIG. 12 depicts a High Efficiency SIGnal B (HE-SIG-B) field and a High Efficiency SIGnal C (HE-SIG-C) field in the HE PPDU frame format according to the present disclosure;

FIG. 15 depicts another exemplary HE PPDU frame format according to the present disclosure;

FIGS. 20 and 21 depict exemplary HE PPDU formats supporting Orthogonal Frequency Division Multiple Access (OFDMA) and Multi-User Multiple Input Multiple Output (MU-MIMO) according to the present disclosure;

FIGS. 22, 23, and 24 depict exemplary frame exchange sequences each including an HE PPDU supporting OFDMA and MU-MIMO according to the present disclosure; and FIGS. 25 to 30 depict exemplary configurations of resource allocation information in an HE PPDU format supporting OFDMA and MU-MIMO according to the present disclosure.

DETAILED DESCRIPTION

Figure 1:
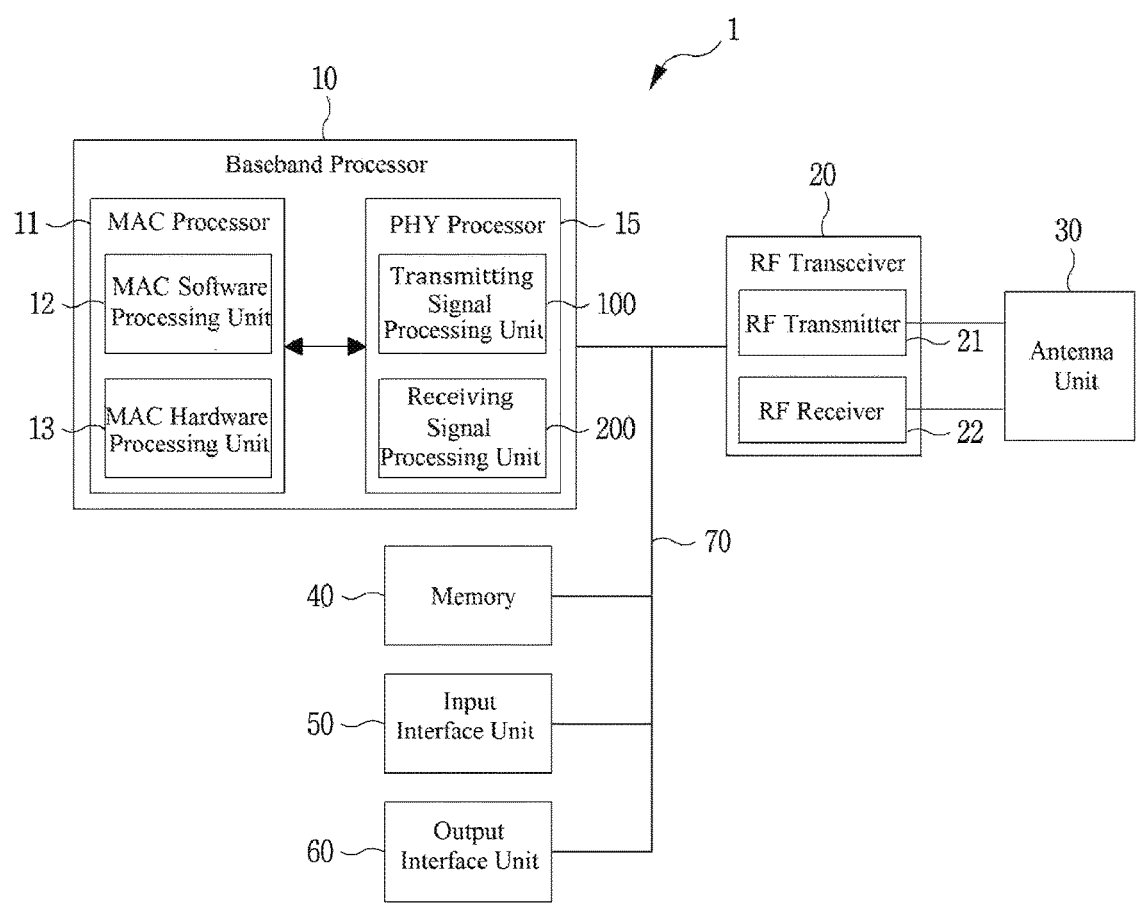
FIG. 1 is a block diagram of a Wireless Local Area Network (WLAN) device.

In the following detailed description, certain embodiments of the present disclosure have been shown and described, by way of illustration. As those skilled in the art would realize, the described embodiments may be modified in various different ways, without departing from the spirit or scope of the present disclosure. Accordingly, the drawings and description are to be regarded as illustrative in nature and not restrictive. Like reference numerals designate like elements throughout the present disclosure.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, which may be or may include a non-transitory computer-readable medium, an input interface unit 50, an output interface unit 60, and a bus 70.

The baseband processor 10 may be simply referred to as a processor, and may perform baseband signal processing described in the present disclosure, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software or machine-executable instructions (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, embodiments of the MAC processor 11 are not limited to this distribution of functionality.

The PHY processor 15 includes a transmitting (TX) signal processing unit 100 and a receiving (RX) signal processing unit 200.

The baseband processor 10, the RF transceiver 20, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple Input Multiple Output (MIMO) or Multi-User MIMO (MU-MIMO) is used, the antenna unit 30 may include a plurality of antennas.

Figure 2:
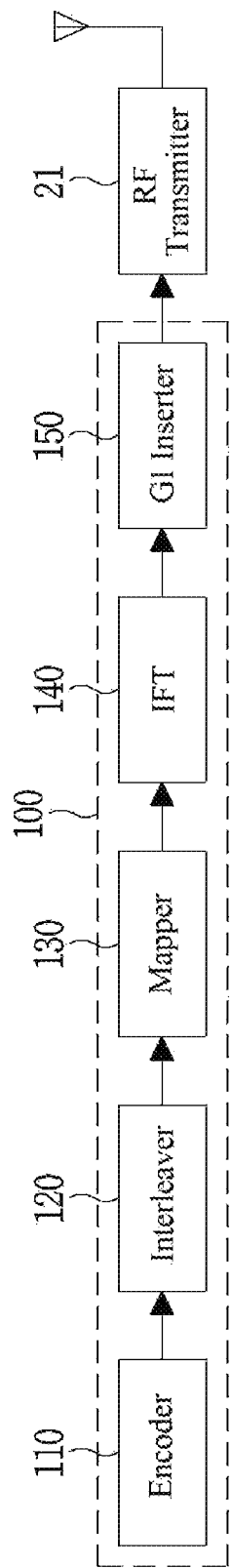
FIG. 2 is a schematic block diagram of an exemplary transmitting signal processing unit in a WLAN.

FIG. 2 is a schematic block diagram of an exemplary transmitting signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
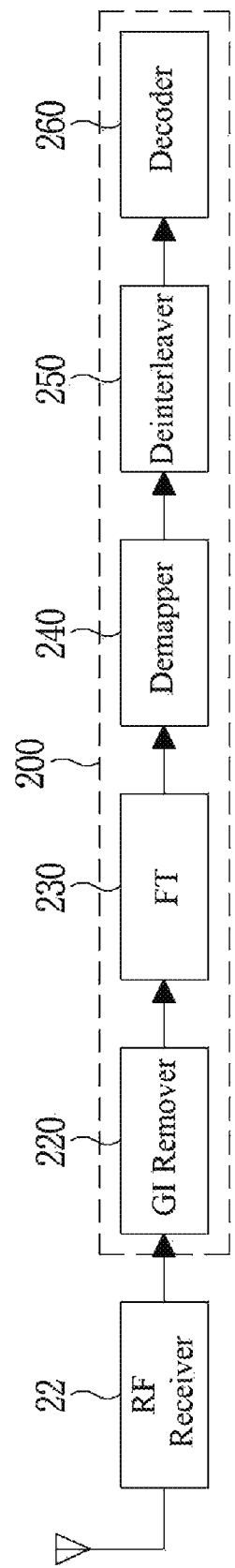
FIG. 3 is a schematic block diagram of an exemplary receiving signal processing unit in a WLAN.

FIG. 3 is a schematic block diagram of an exemplary receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into one or more symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may use/include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, or colloquially as a 'listen before talk' access mechanism. According to the CSMA/CA mechanism, an AP and/or a STA may sense a medium or a channel for a predetermined time before starting transmission, that is, the AP and/or the STA may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in less collisions.

Figure 4:
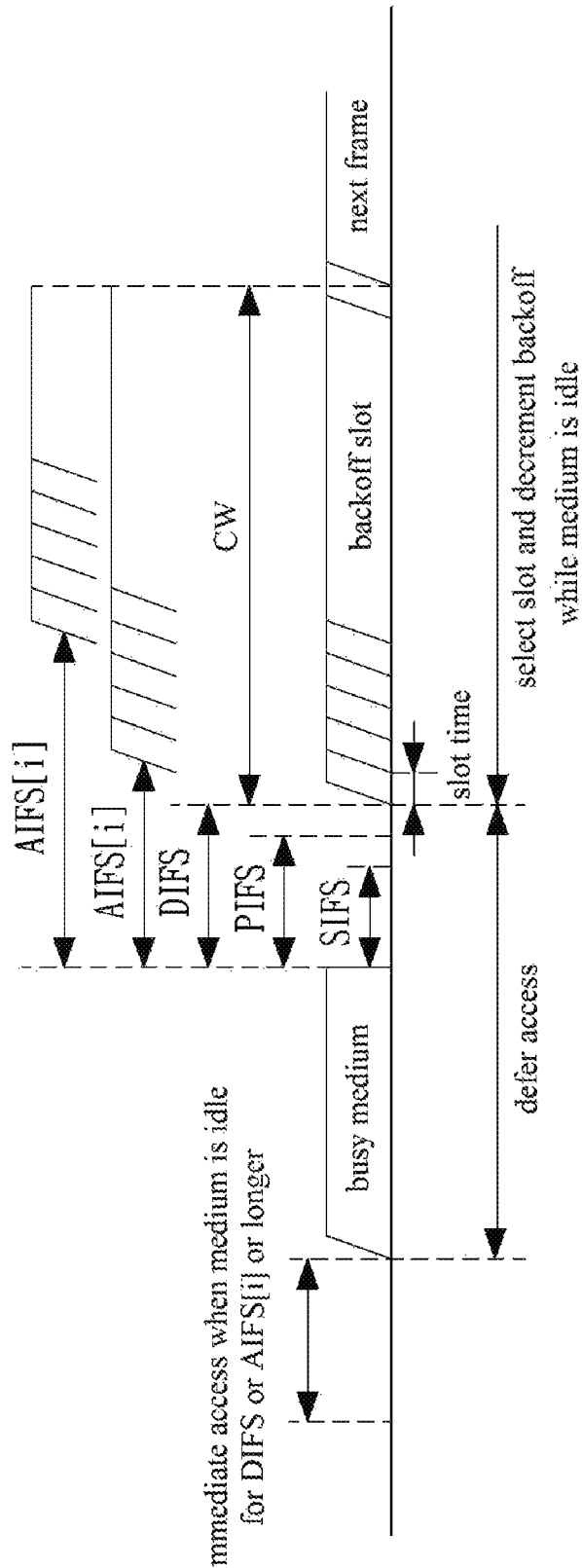
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to a previous frame, the WLAN device transmits the control frame after performing backoff if the DIFS has elapsed. In case that the control frame is a response frame to a previous frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium is idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempts transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
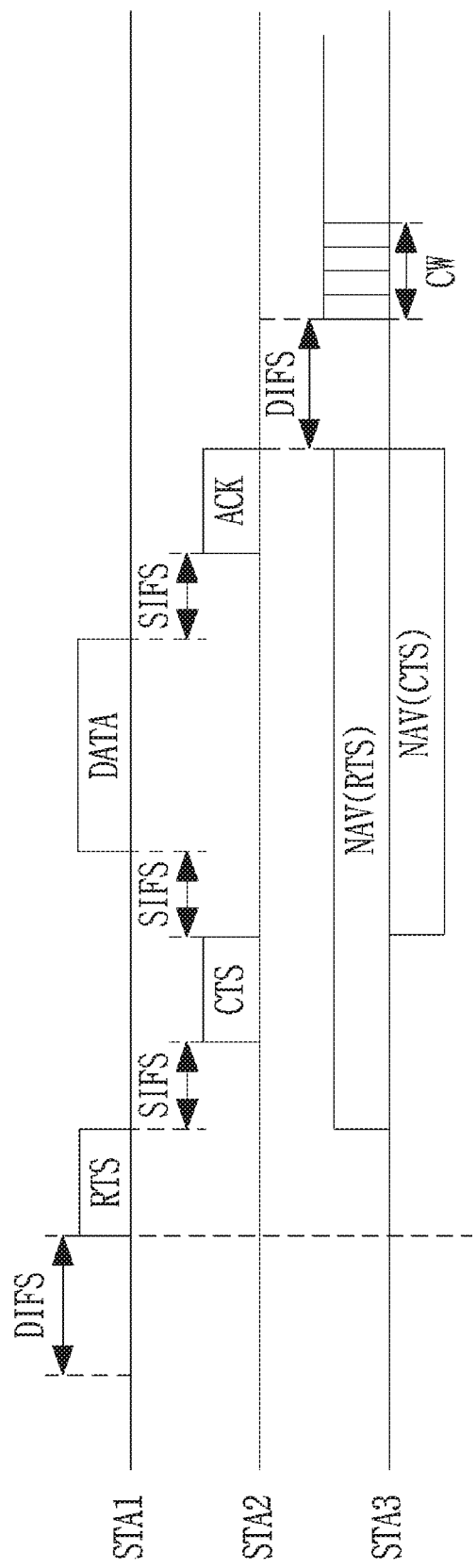
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
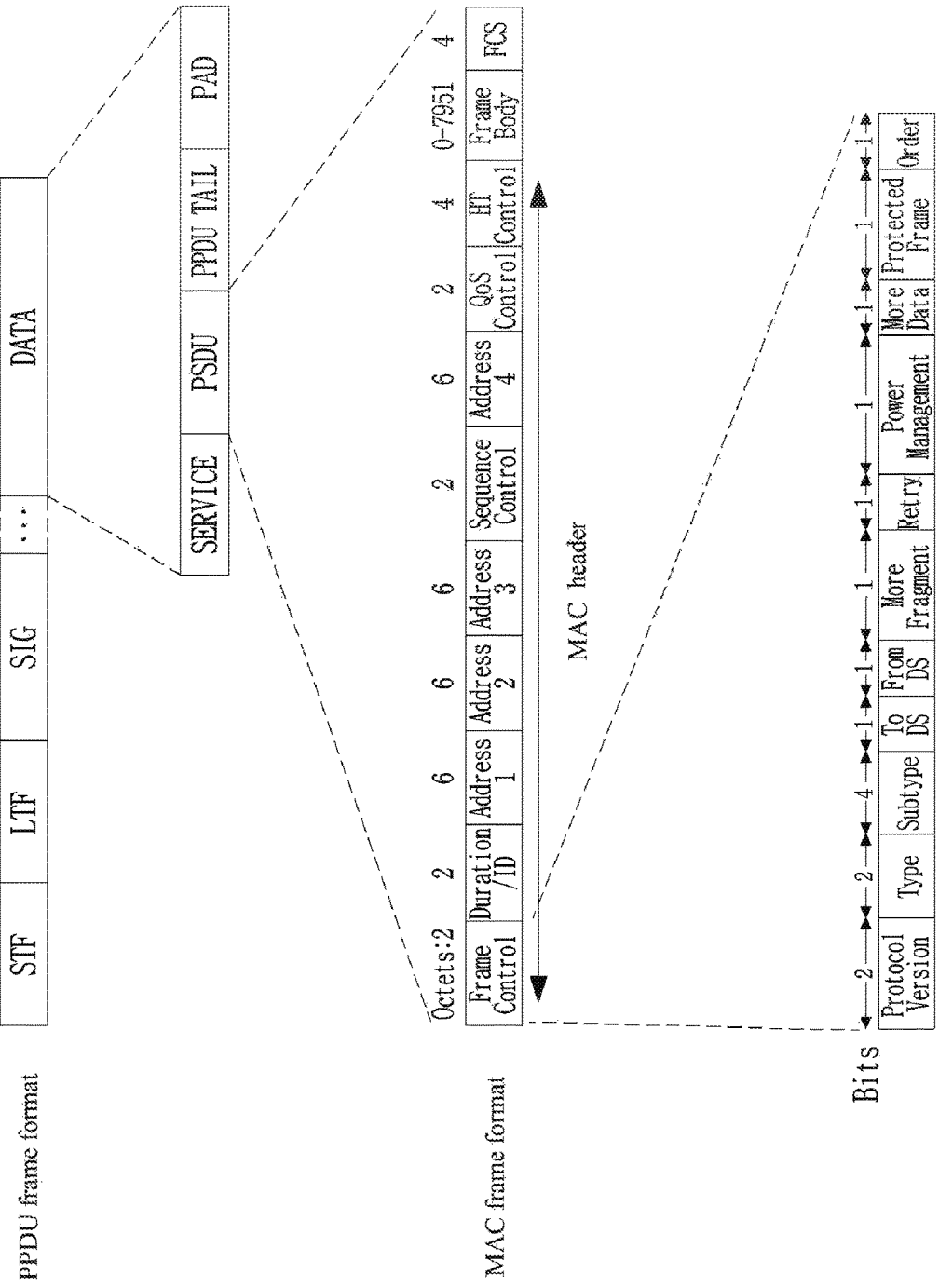
FIG. 6 depicts an exemplary frame structure in a WLAN system.

FIG. 6 depicts an exemplary frame structure in a WLAN system.

PHY layer may prepare for transmission of a MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG)

field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. Some of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification, which is hereby incorporated by reference.

The Frame Control field of the MAC header may include Protocol Version, Type, Subtype, To Distribution System (DS), From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present disclosure, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
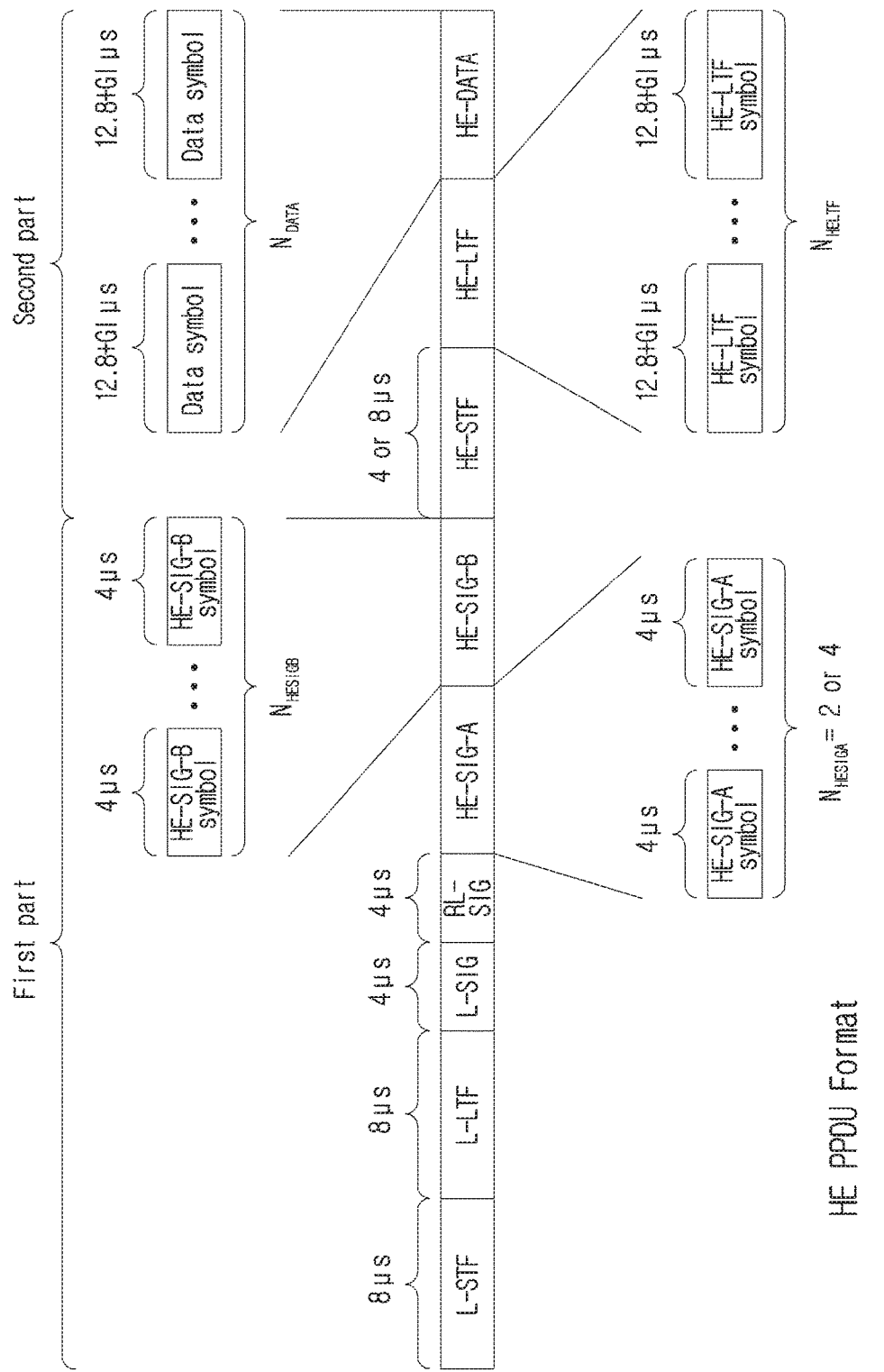
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may receive, detect, and process the PPDU.

The HE PPDU frame format may broadly include two parts: the first part including an L-STF field, an L-LTF field, an L-SIG field, a Repeated L-SIG (RL-SIG) field, an HE-SIG-A field, and an HE-SIG-B field and the second part including an HE-STF field, an HE-LTF field, and an HE-DATA field. 64-FFT based on a channel bandwidth of 20 MHz may be applied to the first part and a basic subcarrier spacing of 312.5 kHz and a basic DFT period of 3.2 µs may be included in the first part. 256-FFT based on a channel bandwidth of 20 MHz may be applied to the second part and a basic subcarrier spacing of 75.125 kHz and a basic DFT period of 12.8 µs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table I.

TABLE I

| Element | definition | duration | DFT period | GI | Subcarrier spacing | Description |
|---|---|---|---|---|---|---|
| Legacy(L)-STF | Non-high throughput(HT) Short Training field | 8 µs | — | — | equivalent to 1,250 kHz | L-STF of a non-trigger-based PPDU has a periodicity of 0.8 µs with 10 periods. |
| L-LTF | Non-HT Long Training field | 8 µs | 3.2 µs | 1.6 µs | 312.5 kHz | |
| L-SIG | Non-HT SIGNAL field | 4 µs | 3.2 µs | 0.8 µs | 312.5 kHz | |
| RL-SIG | Repeated Non-HT SIGNAL field | 4 µs | 3.2 µs | 0.8 µs | 312.5 kHz | |

TABLE I-continued

| Element | definition | duration | DFT period | GI | Subcarrier spacing | Description |
|---|---|---|---|---|---|---|
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}$ * (DTF period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

L-STF, L-LTF, L-SIG, and RL-SIG may be called legacy preambles.

HE-SIG-A is an HE SIGNAL A field and may have a duration of $N_{HESIGA}$*4 μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is an HE SIGNAL B field and may have a duration of $N_{HESIGB}$*4 μs, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is an HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is an HE Long Training field and may have a duration of $N_{HELTF}$*(DFT period+GI)μs. $N_{HELTF}$ represents the number of HE-LTF symbols and may have a value of 1, 2, 4, 6, or 8. An HE PPDU may support a 2×LTF mode and a 4×LTF mode. In the 2×LTF mode, an HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4×LTF mode, an HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2×LTF may have a DFT period of 6.4 μs and 4×LTF may have a DFT period of 12.8 μs. A GI of HE-LTF may support 0.8 μs, 1.6 μs, and 3.2 μs. 2×LTF may have a subcarrier spacing equivalent to 156.25 kHz and 4×LTF may have a subcarrier spacing of 78.125 kHz.

HE-DATA is an HE DATA field and may have a duration of, $N_{DATA}$*(DFT period+GI)μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
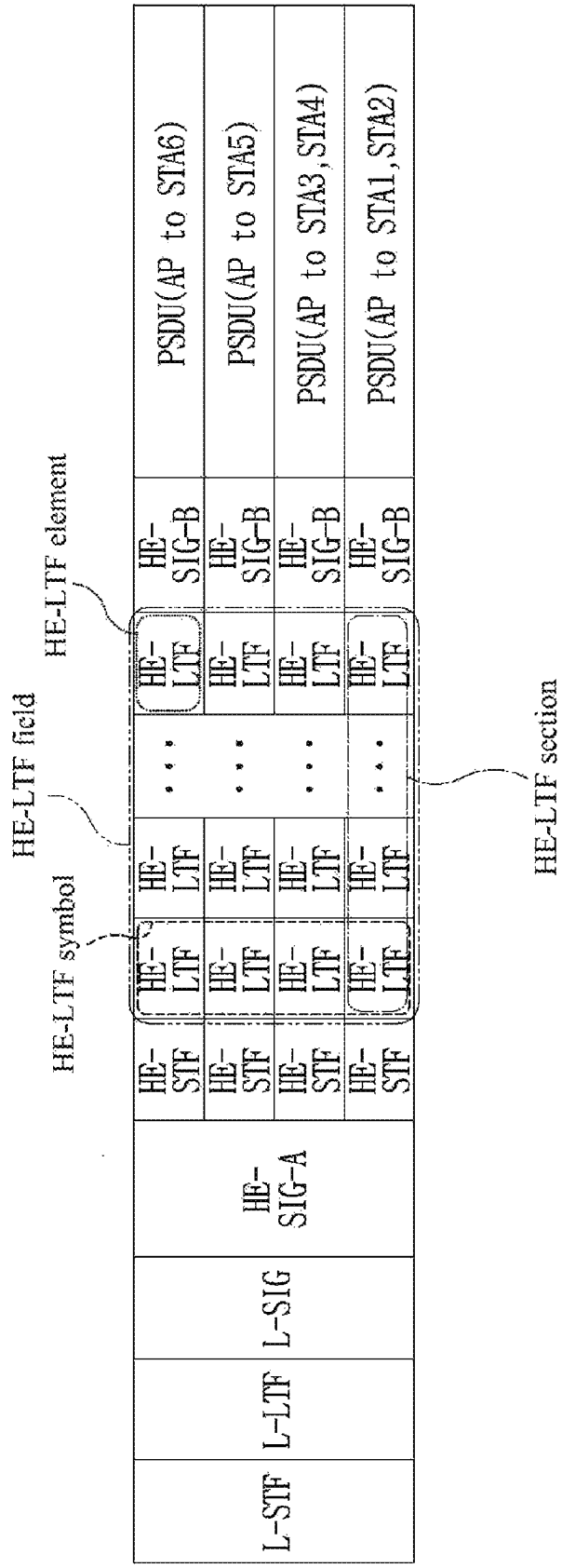
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz). An HE-STF and an HE-LTF may be transmitted on each basic subchannel unit (e.g., 5 MHz)), and an HE-SIG-B and a PSDU may be transmitted on each of the subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may also be referred to as Resource Unit (RU) or subband. In particular, terms like OFDMA subchannel, OFDMA RU, OFDMA subband can be used as synonyms for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, an HE-LTF element may be referred to shortly as an HE-LTF.

An HE-LTF symbol may correspond to a set of HE-LTF elements in one OFDM symbol in time domain and in one channel unit (e.g., 20 MHz) in frequency domain.

An HE-LTF section may correspond to a set of HE-LTF elements in one or more OFDM symbols in time domain and in one subchannel unit (i.e., a subchannel bandwidth allocated to a STA) in frequency domain.

An HE-LTF field may be a set of HE-LTF elements, HE-LTF symbols, or HE-LTF sections for a plurality of STAs.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at an HE STA (or HEW STA). The set of parameters included in the HEW SIG-A field may include one or more of Very High Throughput (VHT) PPDU modulation parameters transmitted by IEEE 802.11ac stations, as listed in Table II below, to ensure backward compatibility with legacy STAs (e.g., IEEE 802.11ac stations).

TABLE II

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |

TABLE II-continued

| Two parts of VHT-SIG-A | Bit | Field | Number of bits | Description |
|---|---|---|---|---|
| | B3 | STBC | 1 | For a VHT SU PPDU:<br>Set to 1 if space time block coding is used and set to 0 otherwise.<br>For a VHT MU PPDU:<br>Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \le p \le 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>VHT-MCS index<br>For a VHT MU PPDU:<br>If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1.<br>B7 is reserved and set to 1 |

TABLE II-continued

| Two parts of VHT-SIG-A | Bit | Field | Number of bits | Description |
|---|---|---|---|---|
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0.23 of VHT-SIG-A1 and bits 0-9 of VHT-SIG-A2, respectively. |
| | B18-B23 | Tail | 6 | Used to terminate the trellis of the convolutional decoder. Set to 0. |

Table II illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification, which is hereby incorporated by reference. In the HE PPDU frame format of the present disclosure, the HE-SIG-A field may include one or more of the fields included in the VHT-SIG-A field, and it may provide backward compatibility with IEEE 802.11ac stations.

Figure 9:
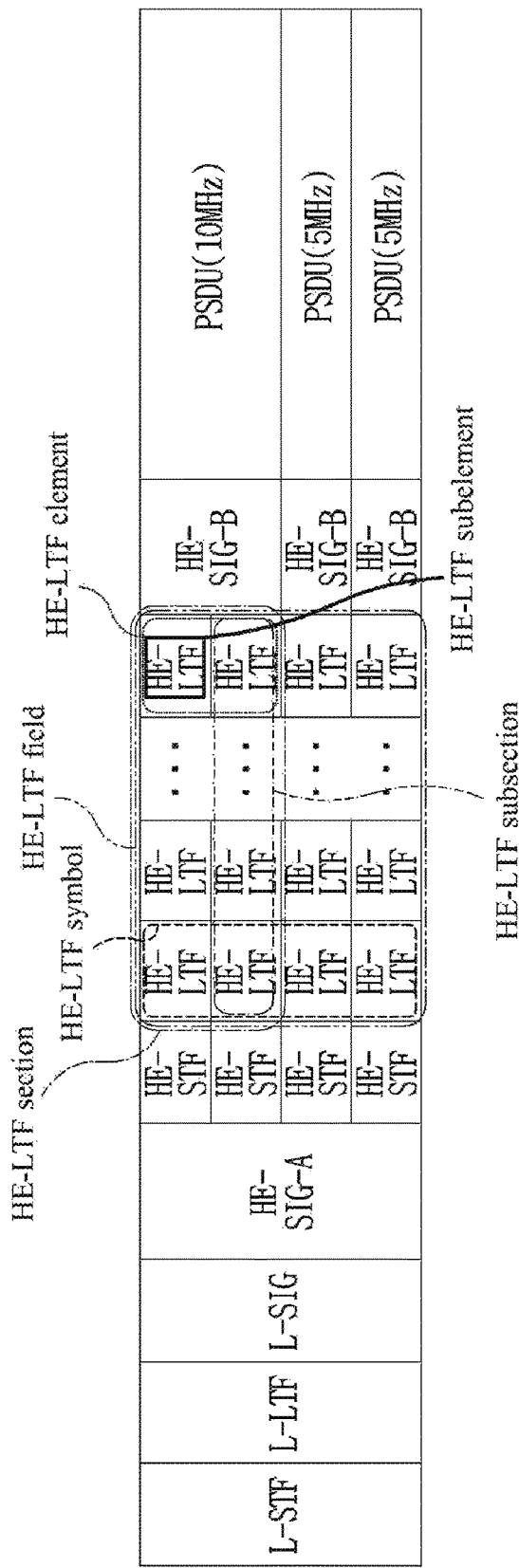
FIG. 9 depicts subchannel allocation in an HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and an HE-SIG-A may be transmitted per channel (e.g., 20 MHz), an HE-STF and an HE-LTF may be transmitted on each basic subchannel unit (e.g., 5 MHz), and an HE-SIG-B and a PSDU may be transmitted on each of the subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice the size of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel (i.e., 10-MHz subchannel, allocated to STA4). An HE-LTF element and an HE-LTF subelement are logical units and the PHY layer does not always operate in units of an HE-LTF element or HE-LTF subelement.

An HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

An HE-LTF section may correspond to a set of HE-LTF elements in one or more OFDM symbols in the time domain and one subchannel unit (i.e. the bandwidth of a subchannel allocated to a STA) in the frequency domain. An HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel (i.e., 10-MHz subchannel, allocated to STA4).

An HE-LTF field may correspond to a set of HE-LTF elements (or subelements), HE-LTF symbols, or HE-LTF sections (or subsections) for a plurality of STAs.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to a STA.

Figure 10:
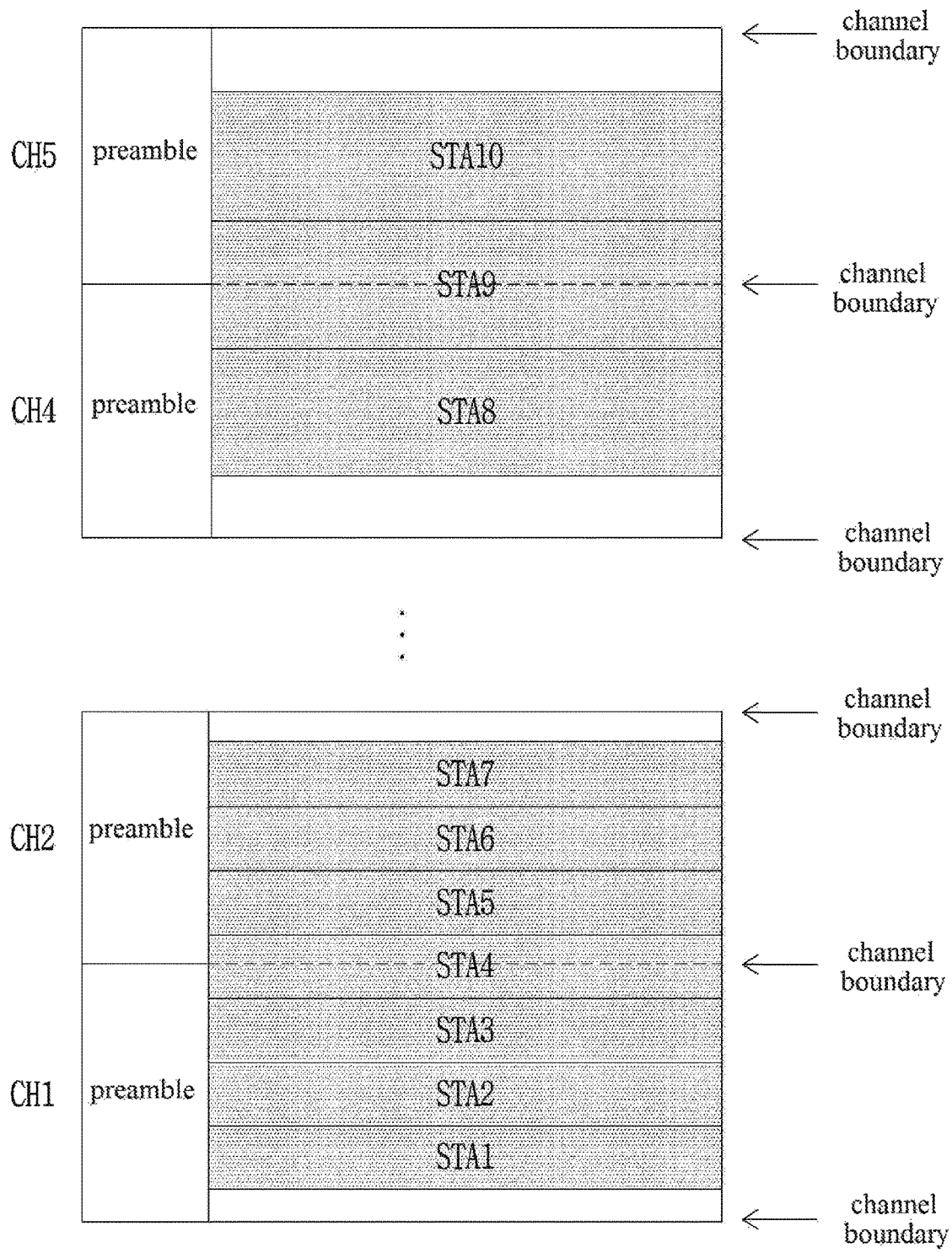
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and an HE-SIG-A as illustrated in the examples of FIGS. 8 and 9.

A subchannel for each HE STA may be allocated within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels, each having double the size (e.g., 10 MHz) of the basic subchannel unit in CH4 and CH5, are allocated to STA8, STA9, and STA10.

As illustrated in the lower part of FIG. 10, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to two channels). In the foregoing example of the present disclosure, the subchannel allocation to STA4 is not allowed.

As illustrated in the upper part of FIG. 10, although a subchannel allocated to STA8 or STA10 is fully overlapped only with one channel (i.e., without crossing the channel boundary, or belonging only to one channel), a subchannel allocated to STA9 is partially overlapped with two channels (i.e., crossing the channel boundary, or belonging to two channels). In the foregoing example of the present disclosure, the subchannel allocation to STA9 is not allowed.

On the other hand, in some embodiments, it may be allowed to allocate a subchannel partially overlapped between a plurality of channels (i.e., crossing the channel boundary, or belonging to two or more channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of an HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to an HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in additional detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, an HE-STF, an HE-LTF, an HE-LTF, an HE-LTF, an HE-LTF, and an HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in an HE-LTF section) as the number of the spatial streams, that is, four HE-LTFs are transmitted to support MU-MIMO transmission.

According to an example of the present disclosure, the relationship between a total number of spatial streams transmitted on one subchannel and a number of HE-LTFs is listed in Table III.

TABLE III

| Total number of spatial streams transmitted on one subchannel | Number of HE-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to Table III as an example, if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number that is 1 larger than the number of the spatial streams need to be transmitted.

Referring to FIG. 11 again, it is assumed that the second 5-MHz subchannel is allocated to STA3 and STA4 and one spatial stream per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, an HE-STF, an HE-LTF, an HE-LTF, an HE-LTF, an HE-LTF, and an HE-SIG-B follow the HE-SIG-A field on the subchannel (i.e., four HE-LTFs are transmitted). This is for the purpose of setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby disrupting orthogonality (i.e., orthogonality is not maintained). To overcome this problem, an additional constraint needs to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the number of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the number of HE-LTFs (HE-LTF symbols or HE-LTF elements in an HE-LTF section) required according to the total number of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that an HE-LTF field starts at the same time point and ends at the same time point in an HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to Table III). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting an HE PPDU frame in the MU-MIMO or OFDMA mode, a transmitter may generate P (where P is an integer equal to or larger than 1) HE-LTF symbols (refer to FIG. 8) and transmit an HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e., P) of another subchannel. Also, the number of HE-LTF elements (i.e., P) included in an HE-LTF section in one of the Q subchannels may be equal to the number of HE-LTF elements (i.e., P) included in an HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or STAs).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are not actually used for channel estimation at the STAs.

FIG. 12 depicts an HE-SIG-B field and an HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, an HE-SIG-A field. An HE-SIG-B field may include spatial stream allocation information about one subchannel. Also, an HE-SIG-C field may be transmitted after transmission of HE-LTFs, including Modulation and Coding Scheme (MCS) information about a PSDU and information about the length of the PSDU, etc.

Figure 13:
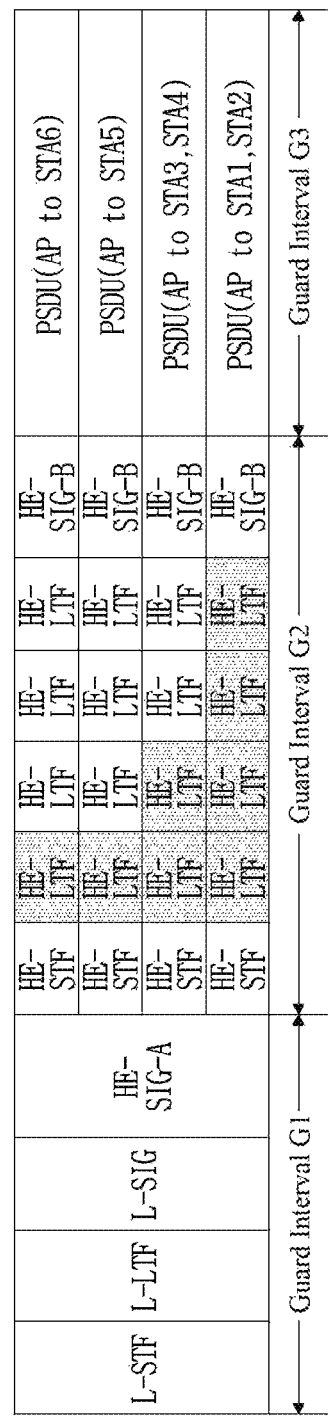
FIG. 13 depicts another example of an HE PPDU frame format according to the present disclosure.

FIG. 13 depicts OFDM symbol durations and GI lengths in the HE PPDU frame format according to the present disclosure.

In the HE PPDU frame format according to the present disclosure, L-STF, L-LTF, L-SIG, and HE-SIG-A fields may be configured with 4.0-μs OFDM symbols based on 64-FFT. One OFDM symbol has a GI of 0.8 μs. In the present disclosure, a GI value applied to the L-STF, L-LTF, L-SIG, and HE-SIG-A fields is defined as G1. The L-STF, L-LTF, L-SIG, and HE-SIG-A fields may include 3.2-μs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 μs and a subcarrier spacing of 312.5 kHz.

The following HE-STF, HE-LTF, HE-SIG-B, and PSDU fields may include 16-μs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-μs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 μs and a subcarrier spacing of 78.125 kHz.

The values of G2 and G3 may be equal or different. If G2 and G3 are equal, G2 and G3 may be defined as one parameter without distinguishing between G2 and G3. In one embodiment, unlike G1, G2 and G3 may vary according to a transmitted PPDU transmission vector, rather than being fixed values (i.e., predetermined values). This is because the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 μs, G2 may be a value selected from 3.2 μs, 1.6 μs, 0.8 μs, and 0.4 μs, and G3 may be a value selected from among 3.2 μs, 1.6 μs, 0.8 μs, and 0.4 μs. Also, G1 may have a fixed value (i.e., a predetermined value) of 0.8 μs, and G2 or G3 may be a value selected or determined from among 3.2 μs, 1.6 μs, 0.8 μs, and 0.4 μs. In one embodiment, G1 does not require separate signaling because G1 is a fixed value, and signaling information indicating G2 and G3 may be provided to an HE STA in the HE-SIG-A field.

In one embodiment, G2 and G3 are applied commonly across all OFDM symbols transmitted during a corresponding time period and across all subchannels. Accordingly, PSDU transmission timings and OFDM symbol timings may be synchronized. For example, it may not be allowed to apply a 3.2-μs G2 value to a subchannel and a 1.6-μs or 0.8-μs G2 value to another subchannel during a specific time period. Rather, the same 3.2-μs G2 value may be applied to the subchannels during the same time period. In a similar example, it may not be allowed to apply a 1.6-μs G3 value to a subchannel and a 3.2-μs or 0.8-μs G3 value to another subchannel during a specific time period. Rather, the same 1.6-μs G3 value may be applied to the subchannels during the same time period.

In the case where an HE PPDU frame format having HE-LTF sections of different lengths for subchannels is used (i.e., in the case where the number of HE-LTFs is not determined for each subchannel based on the maximum of the number of HE-LTFs required according to the total number of spatial streams transmitted on each subchannel in a set of HE STAs allocated to each of subchannels, as described in the example of FIG. 11), if the values of G2 and G3 are different, PSDUs are transmitted on different subchannels at different time points and OFDM symbol timings are not synchronized. Therefore, values of G2 and G3 may need to be selected or determined as a same value.

In the case where an HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 11), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present disclosure does not exclude that values of G2 and G3 may be selected or determined as a same value.

In the example of FIG. 13, OFDM symbol durations S1, S2, and S3 may be applied respectively to time periods to which the GIs G1, G2, and G3 are applied.

Figure 14:
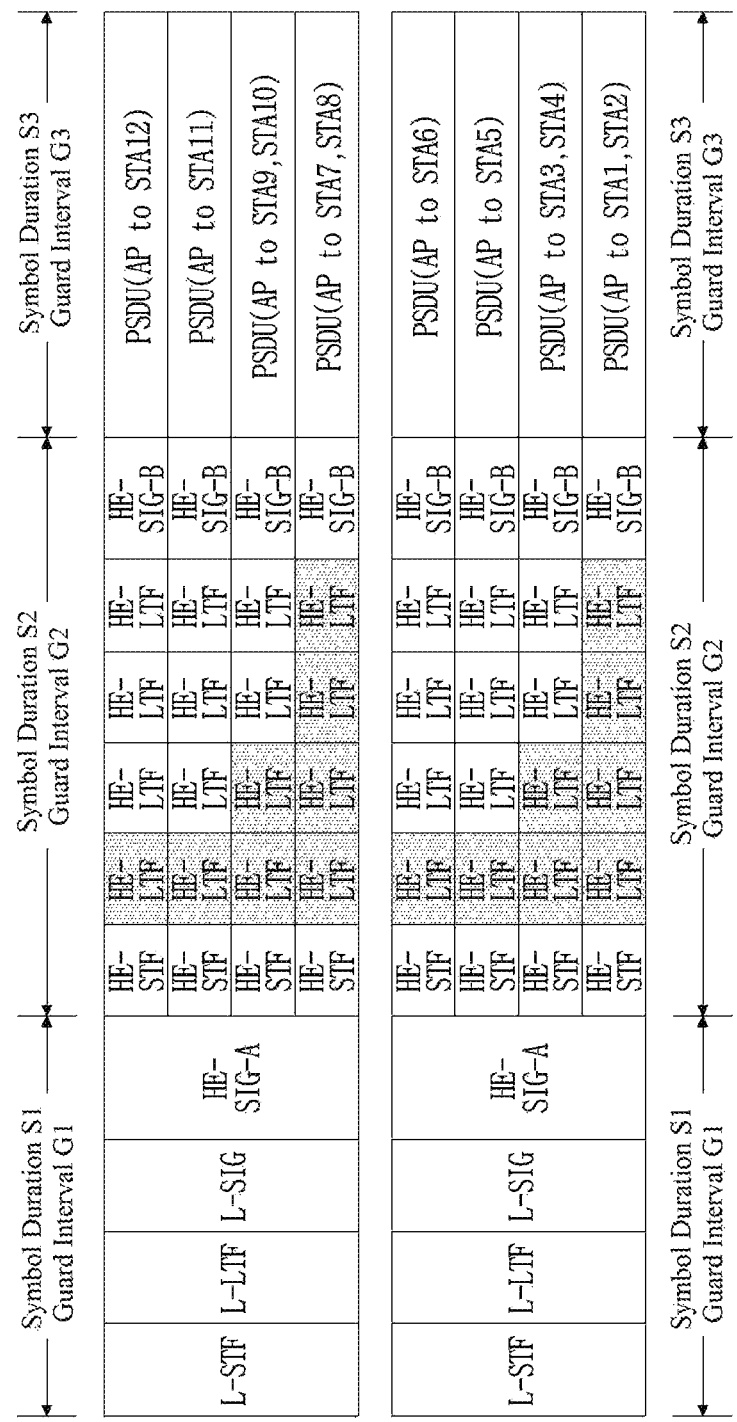
FIG. 14 depicts an exemplary HE PPDU frame format for a wide channel band according to the present disclosure.

FIG. 14 depicts an exemplary HE PPDU frame format for a wide channel band according to the present disclosure.

Referring to FIG. 14, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 11 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the number of HE-LTFs to be transmitted on all subchannels may be determined according to the maximum of the number of HE-LTFs required according to the total numbers of spatial streams transmitted on each subchannel over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that an HE-LTF field starts at the same time point and ends at the same time point on all subchannels over one or more 20-MHz channels for all users (i.e., HE STAs) in MU-MIMO-mode or OFDMA-mode transmission of an HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 14, the OFDM symbol duration and GI of L-STF, L-LTF, L-SIG, and HE-SIG-A fields on the first 20-MHz channel are S1 and G1, respectively. Like the first 20-MHz channel, the second 20-MHz channel has S1 and G1 respectively as the OFDM symbol duration and GI of L-STF, L-LTF, L-SIG, and HE-SIG-A fields.

In FIG. 14, the OFDM symbol duration and GI of an HE-STF field, a plurality of HE-LTFs, and an HE-SIG-B field on the first 20-MHz channel are S2 and G2, respectively. Like the first 20-MHz channel, the OFDM symbol duration and GI of an HE-STF field, a plurality of HE-LTFs, and an HE-SIG-B field on the second 20-MHz channel are also S2 and G2, respectively.

In FIG. 14, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example it is shown that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modified example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel may be the same fixed values in every 20-MHz channel.

Further, this modified example may include application of the example described before with reference to FIG. 11 in which 'subchannels have the same HE-LTF section length' only to subchannels within one 20-MHz channel, not to the HE-LTF section length of subchannels in another 20-MHz channel.

With reference to the foregoing examples of the present disclosure, mainly the features of an HE PPDU frame structure applicable to a DL MU-MIMO-mode or OFDMA-mode transmission that an AP transmits simultaneously to a plurality of STAs has been described. Now, a description will be given of the features of an HE PPDU frame structure applicable to a UL MU-MIMO-mode or OFDMA-mode transmission that a plurality of STAs transmit simultaneously to an AP.

The above-described various examples of structures of the HE PPDU frame format supporting MU-MIMO-mode or OFDMA-mode transmission should not be understood as applicable only to DL without being applicable to UL. Rather, the examples should be understood as also applicable to UL. For example, the above-described exemplary HE PPDU frame formats may also be used for a UL HE PPDU transmission that a plurality of STAs simultaneously transmit to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to an HE STA allocated to each of a plurality of subchannels. Therefore, the AP may include, in an HE-SIG-A field or an HE-SIG-B field, information about the total number of spatial streams transmitted across a channel, a maximum number of spatial streams (i.e., information being a basis of the number of HE-LTF elements (or the starting point and ending point of an HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmit to an AP, each STA being a transmission entity may only be aware of the number of spatial streams in an HE PSDU that it will transmit, without knowledge of the number of spatial streams in an HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, an HE PPDU frame format applicable to a UL MU-MIMO or OFDMA mode may be configured without modification to an exemplary HE PPDU frame format applied to a DL MU-MIMO or OFDMA mode. For example, each STA may configure an HE PPDU frame format by including information about the number of spatial streams across a channel in an HE-SIG-A field, determining the number of HE-LTF elements (or the starting point and ending point of an HE-LTE section) on each subchannel according to the maximum number of spatial streams, and including information about the number of spatial streams for the individual STA in an HE-SIG-B field.

Alternatively, if the STAs operate according to the common/individual parameters received in the trigger frame from the AP, each STA does not need to indicate the common/individual parameters to the AP during an HE PPDU transmission. Therefore, this information may not be included in an HE PPDU. For example, each STA may determine the total number of spatial streams, the maximum number of spatial streams, and the number of spatial streams allocated to individual STA, as indicated by the AP, and configure an HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before an HE-LTF field because the number of spatial streams and the information indicating whether STBC is used or not are significant to determination of configuration information about a preamble and a PSDU in an HE PPDU frame format (e.g., the number of HE-LTF elements is determined according to a combination of the number of spatial streams and the information indicating whether STBC is used or not). For this purpose, an HE PPDU frame format as illustrated in FIG. 15 may be used for a UL HE PPDU transmission.

Figure 15:
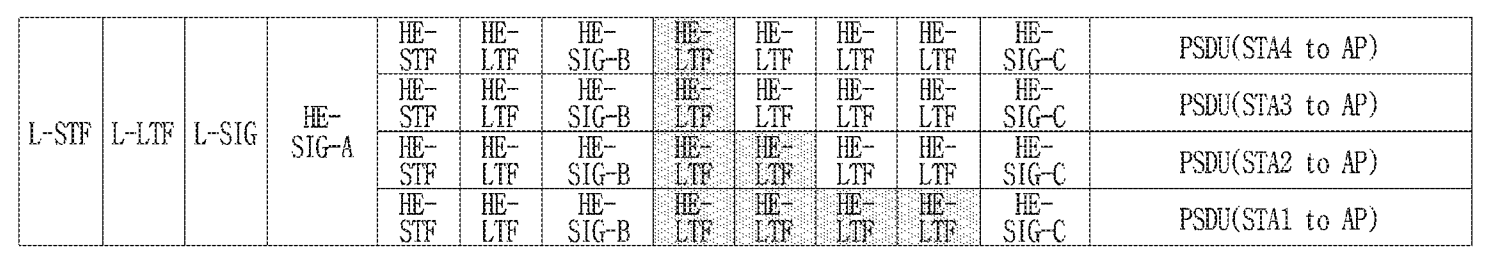

FIG. 15 depicts another exemplary HE PPDU frame format according to the present disclosure. The HE PPDU frame format illustrated in FIG. 15 is characterized in that a structure of HE-SIG-A, HE-SIG-B, and HE-SIG-C fields similar to that in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of an HE-SIG-B field, an HE-SIG-C field, and a first HE-LTF element (i.e., an HE-LTF between an HE-STF field and an HE-SIG-B field) illustrated in FIG. 15 may not be present. In this case, a description of each field given below may be applicable only in the presence of the field.

In the example of FIG. 15, an HE-SIG-A field is transmitted per channel (i.e., per 20-MHz channel) and may include transmission parameters common to simultaneously transmitted HE PSDUs. Since the same information is transmitted in the fields from the L-STF to HE-SIG-A in UL PPDUs transmitted by HE STAs allocated to subchannels, the AP may receive the same signals from the plurality of STAs successfully.

An HE-SIG-B field is transmitted per subchannel in one channel. The HE-SIG-B field may have an independent parameter value according to the transmission characteristics of an HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

An HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similar to DL MU-MIMO-mode or OFDMA-mode HE PPDU transmission, if transmission of PSDUs start at different time points on subchannels in UL MU-MIMO-mode or OFDMA-mode HE PPDU transmission, and if OFDM symbols are not aligned accordingly, then the implementation complexity of an AP that receives a plurality of PSDUs is increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

In the HE PPDU frame format supporting UL MIMO-mode or OFDMA-mode transmission illustrated in FIG. 15, the L-STF, L-LTF, L-SIG, and HE-SIG-A fields may include 4.0-µs OFDM symbols based on 64-FFT. One OFDM symbol has a GI of 0.8 µs. In the present description, a GI value applied to the L-STF, L-LTF, L-SIG, and HE-SIG-A fields is defined as G1. Excluding the GI, the L-STF, L-LTF, L-SIG, and HE-SIG-A fields may be configured as 3.2-µs OFDM symbols based on 64-FFT.

In the example of FIG. 15, an HE-STF field, an HE-LTF field, an HE-SIG-B field, HE-LTF elements(s) in an HE-LTF section, an HE-SIG-C field and a PSDU may include 16-µs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-µs OFDM symbols based on 256-FFT.

The values of G2 and G3 may be equal or different. If G2 and G3 are equal, G2 and G3 may be defined as one parameter without distinguishing G2 from G3. In one embodiment, unlike G1, G2 and G3 may vary according to each transmitted PPDU transmission vector, rather than being fixed values (i.e. predetermined values known to both a transmitter and a receiver). This is because the lengths of the HE-STF, the HE-LTF, the HE-SIG-B, the HE-LTF element(s) in an HE-LTF section, and the HE-SIG-C to which G2 is applied may vary according to a PPDU transmission vector and the length of the PSDU to which G3 is applied may also vary according to the PPDU transmission vector.

In another example, the G1 applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 µs, 1.6 µs, 0.8 µs, and 0.4 µs).

More specifically, G1 may have a fixed value (i.e. a predefined value known to both a transmitter and a receiver) of 0.8 µs, G2 may be a value selected or indicated from among 3.2 µs, 1.6 µs, 0.8 µs, and 0.4 µs, and G3 may be a value selected or indicated from among 3.2 µs, 1.6 µs, 0.8 µs, and 0.4 µs. Also, G1 may be a fixed value (i.e. a predefined value known to both a transmitter and a receiver) of 0.8 µs, and G2 or G3 may be a value selected or indicated from among 3.2 µs, 1.6 µs, 0.8 µs, and 0.4 µs. G1 does not require signaling because G1 is a fixed value, and signaling information indicating G2 and G3 may be provided to the AP. If an HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that a 3.2-µs G2 value is applied to a subchannel during a specific time period, while a 1.6-µs or 0.8-µs G2 value is applied to other subchannels during the same time period. Rather, the same 3.2-µs G2 value may be applied to other subchannels during the same time period. In a similar example, it is not allowed that a 1.6-µs G3 value is applied to a subchannel during a specific time period, while a 3.2-µs or 0.8-µs G3 value is applied to other subchannels during the same time period. Rather, the same 1.6-µs G3 value may be applied to other subchannels during the same time period.

In the case where an HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values for G2 and G3 may need to be selected or indicated in this case.

In the case where an HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values for G2 and G3 does not cause a problem. However, even in this case, selection or indication of the same values for G2 and G3 is not excluded.

In the example of FIG. 15, OFDM symbol durations S1, S2, and S3 may be applied respectively to time periods to which the GIs G1, G2, and G3 are applied.

As described before, a plurality of STAs may simultaneously transmit PSDUs in an HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Figure 16:
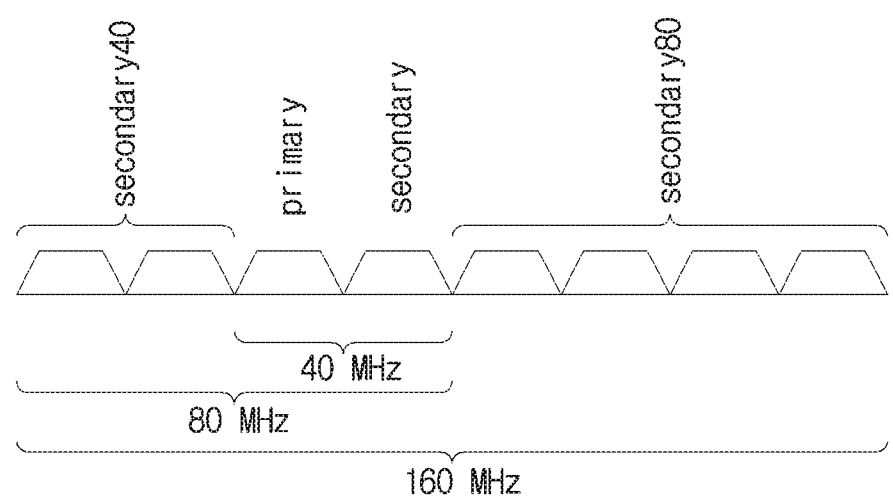
FIGS. 16 and 17 depict operating channels in a WLAN system.
Figure 17:
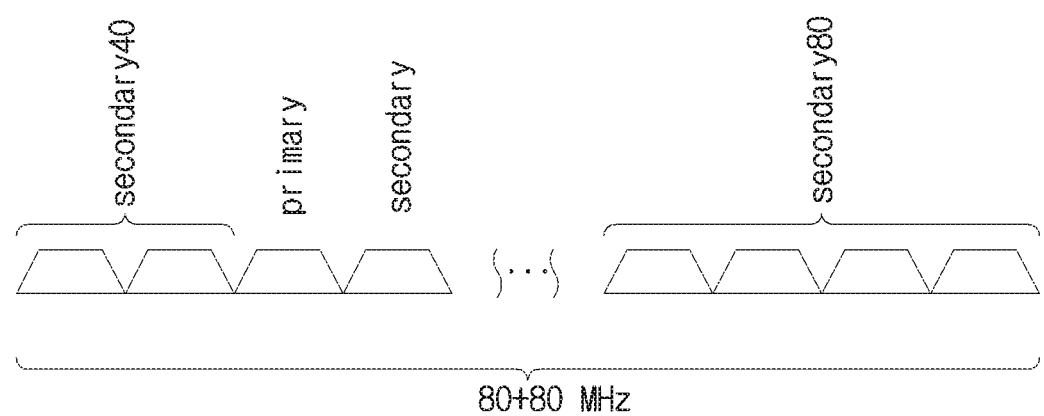

FIGS. 16 and 17 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 16). Further, the WLAN system may support a BSS operating channel having a bandwidth of 160 MHz including non-contiguous 80-MHz channels (called a bandwidth of 80+80 MHz) (refer to FIG. 17).

As illustrated in FIG. 16, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 17, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If a STA uses a channel width larger than the channel width of the primary channel, for data transmission, the STA may use another channel within a corresponding channel, in addition to the primary channel. This additional channel is referred to as a secondary channel.

A STA according to an Enhanced Distributed Channel Access (EDCA) scheme may determine a transmission bandwidth (or a transmission channel width) as follows.

Upon generation of a transmission frame, a STA (e.g., an AP or a non-AP STA) may perform a back-off procedure on a primary channel in order to acquire a Transmission Opportunity (TXOP). For this purpose, the STA may sense the primary channel during a DIFS or AIFS[i]. If the primary channel is idle, the STA may attempt to transmit the frame. The STA may select a random back-off count, wait for a slot time corresponding to the selected random back-off count, and then attempt to transmit the frame. The random back-off count may be determined to be a value ranging from 0 to CW (CW is a value of a contention window parameter).

When the random back-off procedure starts, the STA may activate a back-off timer according to the determined back-off count and decrement the back-off count by 1 each time. If the medium of the corresponding channel is monitored as busy, the STA discontinues the count-down and waits. If the medium is idle, the STA resumes the count-down. If the back-off timer reaches 0, the STA may determine a transmission bandwidth by checking whether the secondary channel is idle or busy at the corresponding time point.

For example, the STA may monitor a channel-idle state during a predetermined IFS (e.g., DIFS or AIFS[i]) lip on the primary channel and determine a transmission start timing on the primary channel by the random back-off procedure. If the secondary channel is idle during a PIFS shortly before the determined transmission start timing of the primary channel, the STA may transmit a frame on the primary channel and the secondary channel.

As described above, when the back-off timer reaches 0 for the primary channel, the STA may transmit an X-MHz mask PPDU (e.g., where X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH, is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

As described before, if a STA is allowed to start a TXOP and has at least one MAC Service Data Unit (MSDU) to be transmitted under the Access Category (AC) of the TXOP allowed for the STA, the STA may perform one of the following a), b), c), d), or e) (in the following description, FIGS. 16 and 17 may be referred to for a primary channel (i.e., a primary 20-MHz channel) a secondary channel (i.e., a secondary 20-MHz channel), a secondary 40-MHz channel, and a secondary 80-MHz channel).

a) If the secondary channel, the secondary 40-MHz channel, and the secondary 80-MHz channel are idle during a PIFS shortly before the start of the TXOP, a 160-MHz or 80+80-MHz mask PPDU may be transmitted.

b) If both the secondary channel and the secondary 40-MHz channel are idle during the PIFS shortly before the start of the TXOP, an 80-MHz mask PPDU may be transmitted on a primary 80-MHz channel.

c) If the secondary channel is idle during the PIFS shortly before the start of the TXOP, a 40-MHz mask PPDU may be transmitted on a primary 40-MHz channel.

d) A 20-MHz mask PPDU may be transmitted on the primary 20-MHz channel.

e) A channel access attempt may be resumed by performing a back-off procedure as in the case where the medium is indicated as busy on the primary channel by one of physical carrier sensing and virtual carrier sensing and a back-off timer has a value of 0.

Now, a description will be given below of a Group ID (GID) and a Partial Association Identifier (Partial AID or PAID) that are used in an HE PPDU.

A Partial AID is a non-unique STA ID. The Partial AID may be included in a TXVECTOR parameter of an SU PPDU, PARTIAL_AID, and may have a maximum size of 9 bits.

A STA, which transmits a partial HE SU PPDU including one or more group addressed MPDUs or an HE NDP intended for a plurality of recipients, may set a TXVECTOR parameter, GROUP_ID, to 63 and a TXVECTOR parameter, PARTIAL_AID, to 0.

A STA, which transmits a partial HE SU PPDU including one or more individually addressed MPDUs or an HE NDP intended for a single recipient, may set the TXVECTOR parameters, GROUP_ID and PARTIAL_AID, as illustrated in Table IV below.

TABLE IV

| Condition | GROUP_ID | PARTIAL_AID |
|---|---|---|
| Addressed to AP | 0 | BSSID[39:47] |
| Addressed to Mesh STA | 0 | RA[39:47] |
| Sent by an AP and addressed to a STA associated with that AP or sent by a DLS or TDLS STA in a direct path to a | 63 | (dec(AID[0:8]) + dec(BSSID[44:47] $\oplus$ BSSID[40:43]) × $2^5$) mod $2^9$ where $\oplus$ is a bitwise exclusive OR operation mod X indicates the X-modulo operation dec(A[b:c]) is the cast to |

TABLE IV-continued

| Condition | GROUP_ID | PARTIAL_AID |
|---|---|---|
| DLS or TDLS peer STA | | decimal operator where b is scaled by $2^0$ and c by $2^{c-b}$ |
| Otherwise (see NOTE) | 63 | 0 |

NOTE
The last row covers the following cases:
A PPDU sent to an IBSS STA
A PPDU sent by an AP to a non associated STA
Any other condition not explicitly listed elsewhere in the table In Table IV, dec(A) represents the decimal value of a binary number A. A[b:c] represents bit b to bit c of the binary number A, if the first bit position of the binary number A is bit0. That is, AID[0:8] represents a bit stream with 9 bits at position 0 to position 8 in a 13-bit AID bit stream. Mod represents a modulo operation, and X mod Y is defined as the remainder of X divided by Y. ⊕ represents a bitwise eXclusive OR (XOR) operation. For example, 1 XOR 1=0, 0 XOR 1=1, 1 XOR 0=1, and 0 XOR 0=0.

In Table IV, AID[b:c] represents bit b to bit c of the AID of a receiver, if the first transmitted bit is bit 0. BSSID[b:c] represents bit b to bit c of a BSSID and bit 0 corresponds to an individual/group bit. BSSID[0] is the individual/group bit and BSSID[47] is the last transmitted bit. RA[b:c] represents bit b to bit c of a Receiver Address (RA) field and bit 0 corresponds to an individual/group bit. RA[0] is the individual/group bit and RA[47] is the last transmitted bit.

The STA may include values calculated according to Table IV in PHYCONFIG_VECTOR parameters, PARTIAL_AID_LIST_GID00 and PARTIAL_AID_LIST_GID63.

A STA, which transmits an HE PPDU to a Direct-Link Setup (DLS) or Tunneled Direct-Link Setup (TDLS) peer STA, may acquire the AID of the peer STA from a DLS Setup Request frame, a DLS Setup Response frame, a TDLS Setup Request frame, or a TDLS Setup Response frame.

An AP may not allocate an AID with PARTIAL_AID set to 0 to a STA.

A STA, which transmits an HE MU PPDU, may set the TXVECTOR parameter, GROUP_ID, in the following manner.

A Group ID field (e.g., the Group ID field may be included in an HE-SIG-A or HE-SIG-B field of the HE MU PPDU) may have a value ranging from 1 to 62 and may indicate the HE MU PPDU. Before transmitting the HE MU PPDU, the AP may perform group allocation for a STA supporting DL MU-MIMO using a Group ID Management frame.

Figure 18:
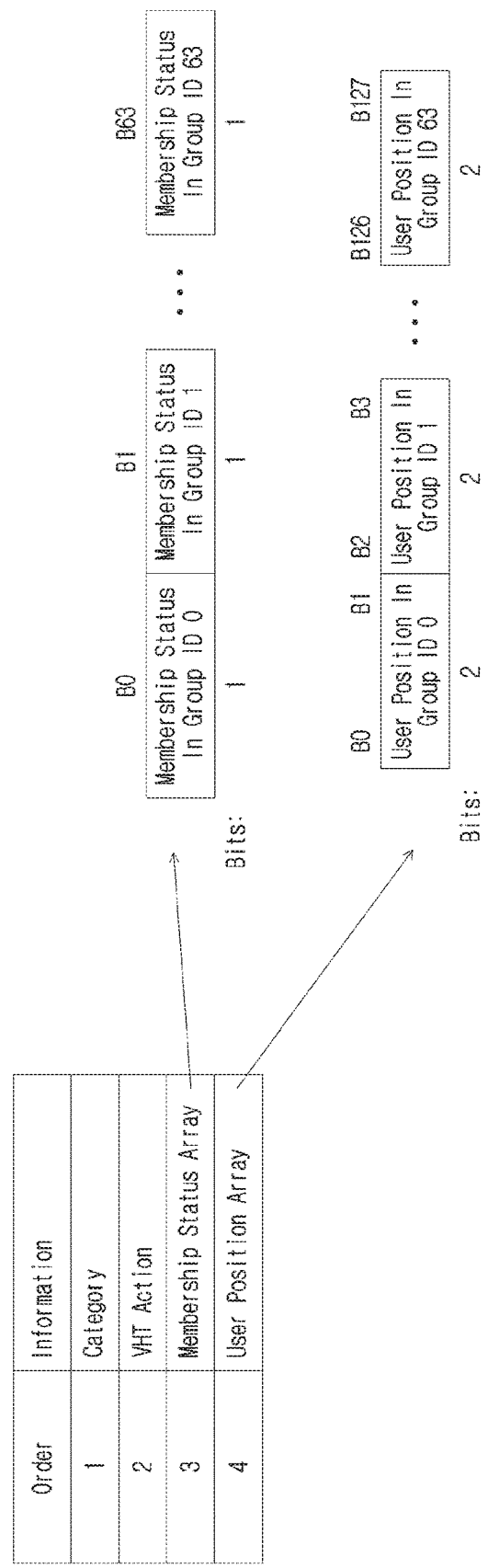
FIG. 18 depicts a format of a Group IDentifier (ID) Management frame.

FIG. 18 depicts a format of the Group ID Management frame.

The AP may transmit the Group ID Management frame to allocate or change the user position of a STA with respect to one or more Group IDs. As illustrated in FIG. 18, the Group ID Management frame may include a Category field, a VHT Action field, a Membership Status Array field, and a User Position Array field.

The Category field may be set to a value indicating that the frame corresponds to VHT or HE.

The VHT Action field may be configured as an HE Action field, and the VHT Action field or the HE Action field may be set to a value indicating group ID management.

The Membership Status Array field may have a size of 8 octets. The 8-octet Membership Status Array field may be indexed by a Group ID and include a 1-bit Membership Status subfield for each of 64 Group IDs. If a STA is not a member of a group identified by a Group ID, the 1-bit Membership Status subfield for the Group ID may be set to 0, and if the STA is a member of the group, the 1-bit Membership Status subfield may be set to 1. The Membership Status subfields for Group ID 0 (i.e., transmission to an AP) and Group ID 63 (i.e., DL SU transmission) may be reserved.

The User Position Array field may be 16 octets long. The 16-octet User Position Array field may be indexed by a Group ID, and include a 2-bit User Position subfield for each of the 64 Group IDs. If the User Position subfield is set to 00, 01, 10, and 11, it may indicate user positions 0, 1, 2, and 3, respectively. If the Membership Status subfield for a Group ID is 0 (i.e., the STA is not a member of a group identified by the Group ID), the User Position subfield for the Group ID may be reserved. The User Position subfields for Group ID 0 (i.e., transmission to an AP) and Group ID 63 (i.e., DL SU transmission) may be reserved.

Once group ID management is configured for a STA, a mapping relationship between Group IDs and membership statuses and a mapping relationship between Group IDs and user positions may be configured. For example, a look-up table such as MembershipStatusInGroupID[g] representing a membership status in Group ID g ($1 \leq g \leq 62$) and UserPositionInGroupID[g] representing a user position in Group ID g($1 \leq g \leq 62$) may be configured.

If the STA receives an HE MU PPDU with a Group ID field (e.g., the Group ID field may be included in an HE-SIG-A or HE-SIG-B of the HE MU PPDU) set to k and MembershipStatusInGroupID[k] set to 1, the number of space-time streams for the STA may be indicated by an MU NSTS field (specifically, MU[UserPositionInGroupD[k]] NSTS field) (e.g., the MU NSTS field may be included in the HE-SIG-A or HE-SIG-B of the HE MU PPDU). Space-time streams for different users may be arranged in an order based on the user position values of the users. That is, a space-time stream for a user corresponding to user position 0 may be first arranged, followed sequentially by a space-time stream for a user corresponding to user position 1, a space-time stream for a user corresponding to user position 2, and a space-time stream for a user corresponding to user position 3.

Some STA may identify a space-time stream intended for another STA, which acts as interference with the STA. HE-LTF symbols of the HE MU PPDU may be used not only for channel measurement for a space-time stream for a STA but also for channel measurement for an interfering space-time stream. To successfully demodulate the space-time stream intended for the STA, the STA may use channel state information about all space-time streams to thereby reduce the effect of the interfering space-time stream.

If the STA receiving the PPDU determines that it is not a member of a group, or it is a member of the group but the MU NSTS field indicates allocation of zero space-time stream to the STA, the STA may not process the remaining part of the PPDU.

Figure 19:
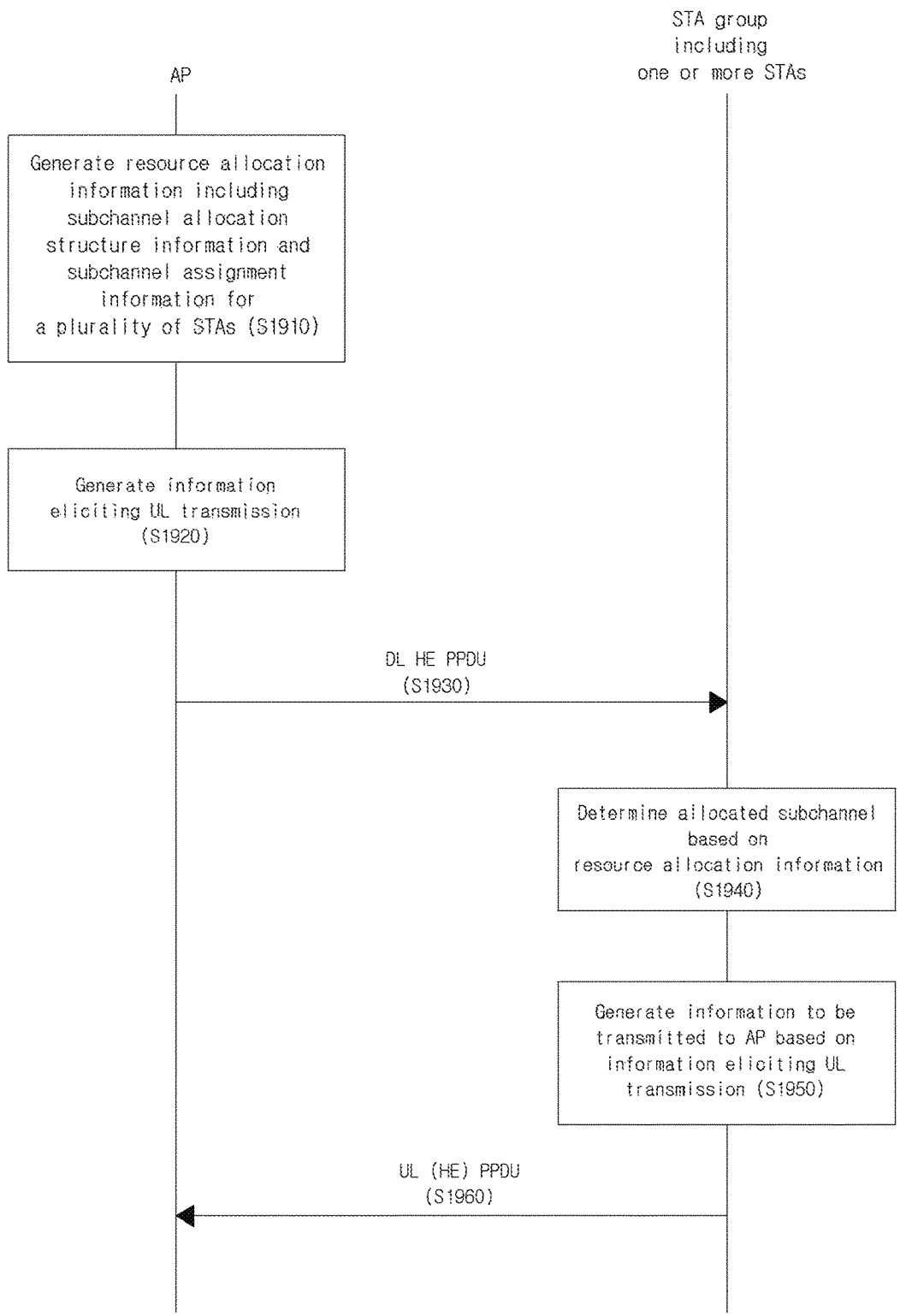
FIG. 19 depicts a method for allocating resources for HE PPDU transmission according to the present disclosure.

FIG. 19 depicts a method for allocating resources for HE PPDU transmission according to the present disclosure.

As described before, an HE PPDU proposed by the present disclosure may support SU transmission or MU transmission. For OFDMA transmission, MU-MIMO transmission, or OFDMA and MU-MIMO transmission, for example, the HE PPDU may include resource allocation information for a plurality of STAs. Hereinbelow, methods for efficiently configuring resource allocation information for transmission of an HE PPDU and transmitting and receiving the HE PPDU will be described.

In step S1910, an AP may generate resource allocation information for a STA group including one or more STAs.

For example, the resource allocation information may be configured such that the same STA may not be allocated to different resources redundantly. Specific examples of such a case will be described later with reference to FIGS. 20 and 21. Further, the resource allocation information may include Subchannel Allocation Structure (SAS) information and subchannel assignment information. The resource allocation may further include MU-MIMO allocation subchannel indication information and space configuration information, which will be described later with reference to examples illustrated in FIGS. 25 to 30.

The AP may generate information triggering (or eliciting) UL transmission from the STA group including the one or more STAs in step S1920. For example, if a DL HE PPDU transmitted on a 20-MHz channel includes information triggering UL transmission, it may be regulated that the UL transmission is performed on the 20-MHz channel carrying the DL HE PPDU. The information triggering UL transmission may be information triggering UL ACK transmission, resource allocation information for UL MU transmission, or the like, which will be described later with reference to specific examples illustrated in FIGS. 22, 23, and 24.

In step S1930, the AP may transmit, to the STA group including the one or more STAs, a DL HE PPDU including an HE-SIG field with the resource allocation information generated in step S1910 and data units (e.g., PSDUs) with the information triggering UL transmission generated in step S1920.

In step S1940, each STA of the STA group may determine a subchannel allocated to the STA based on the resource allocation information included in the HE PPDU. For example, the STA may check the number of subchannels in the transmission channel (e.g., one or more 20-MHz channels) and the sizes of the subchannels based on the SAS information included in the HE-SIG field of the HE PPDU received on the transmission channel, and determine the subchannel allocated to the STA based on the subchannel assignment information.

In step S1950, each STA may generate information to be transmitted to the AP based on the information triggering UL transmission included in a data unit on the subchannel determined to have been allocated to the STA. For example, if the information triggering UL transmission is information triggering UL ACK transmission, the STA may generate a UL PPDU including ACK information to be transmitted to the AP. If the information triggering UL transmission is information triggering UL MU transmission, the STA may generate a UL MU PPDU to be transmitted simultaneously with one or more other STAs.

In step S1960, each STA may transmit a UL PPDU (e.g., an ACK PPDU) or a UL HE PPDU (e.g., a UL MU PPDU) to the AP.

It may be contemplated as an exemplary modification of the method illustrated in FIG. 19 that after the HE-SIG field including the resource allocation information generated in step S1910 is transmitted to the STA group including the one or more STAs, the data units (e.g., PSDUs) including the information triggering UL transmission generated in step S1920 are transmitted to the STA group including the one or more STAs, for HE PPDU transmission.

Each STA may also determine a subchannel allocated to the STA based on the resource allocation information included in the HE-SIG field of the HE PPDU received on the transmission channel (e.g., one or more 20-MHz channels) in step S1940, move to the determined subchannel (i.e., a subchannel having a smaller bandwidth than the transmission channel of the HE PPDU), and receive the remaining fields (e.g., an HE-STF, an HE-LTF, and a data unit) of the HE PPDU on the subchannel allocated to the STA in step S1950. The subsequent operations are performed in the same manner as described before with reference to FIG. 19 and thus will not be described to avoid redundancy.

Figure 21:
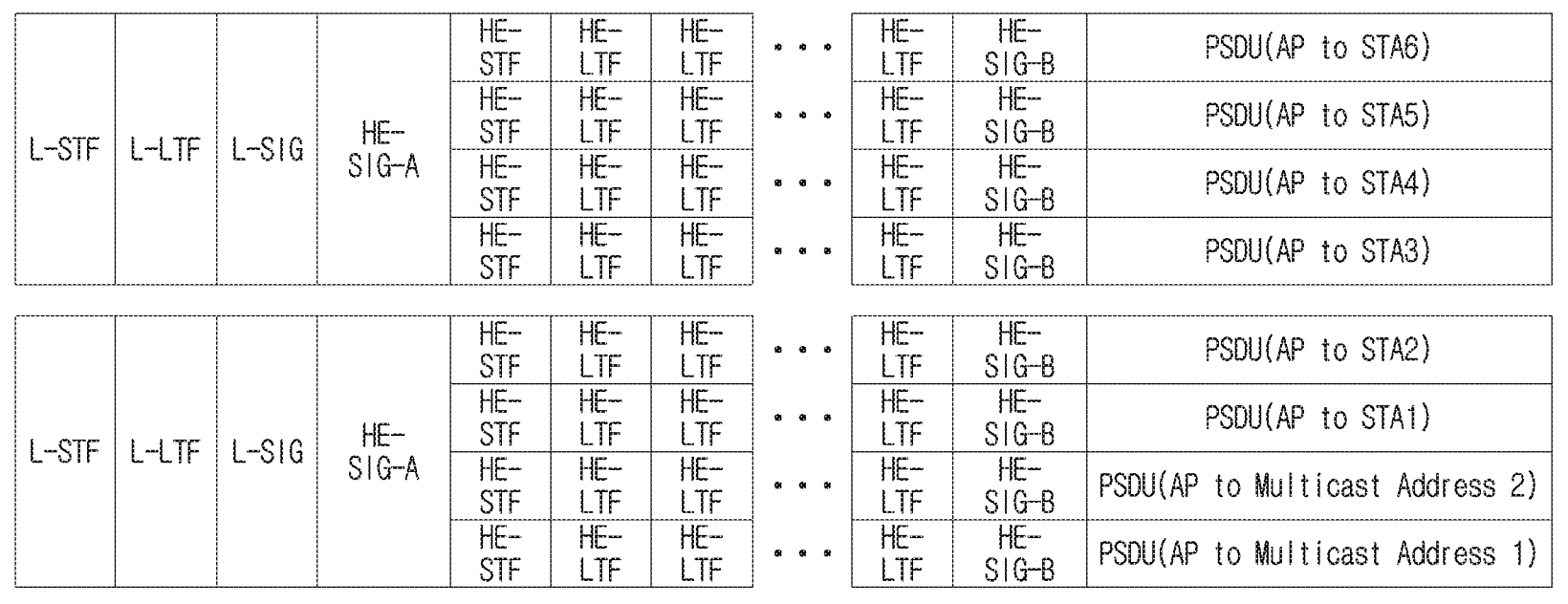

FIGS. 20 and 21 depict exemplary HE PPDU formats supporting OFDMA and MU-MIMO according to the present disclosure.

The HE PPDU of the present disclosure may support OFDMA and MU-MIMO. For example, some of a plurality of frequency resources distinguished from one another in OFDMA may be allocated to a plurality of STAs, and a plurality of space-time resources distinguished from one another in MU-MIMO may be allocated to the plurality of STAs, whereas other frequency resources may be allocated to a single STA. For example, OFDMA-based frequency resources may be a subchannel or a resource unit, and MU-MIMO-based space-time resources may be a space-time stream.

A data unit transmitted in frequency resources allocated to a plurality of STAs may include a group addressed frame. The group addressed frame may be referred to as a multicast frame, a broadcast frame, or an MU-MIMO frame. A data unit transmitted in frequency resources allocated to a single STA may include an individually addressed frame. The individually addressed frame may be referred to as a unicast frame or an SU frame.

In the HE PPDU of the present disclosure, each of a plurality of frequency resources distinguished from one another in OFDMA may be used for a group addressed frame or an individually addressed frame. Or a part of the plurality of frequency resources may be allocated for a group addressed frame, and the other frequency resources may be allocated for an individually addressed frame.

In the example of FIG. 20, a plurality of data units (e.g., PSDUs) transmitted simultaneously in an HE PPDU may include group addressed frames and individually addressed frames. For example, the AP may transmit a group addressed frame intended for multicast address 1 on a first subchannel among a plurality of subchannels within one 20-MHz channel, a group addressed frame intended for multicast address 2 on a second subchannel among the plurality of subchannels, an individually addressed frame intended for STA1 on a third subchannel among the plurality of subchannels, and an individually addressed frame intended for STA2 on a fourth subchannel among the plurality of subchannels.

FIG. 21 illustrates an example in which group addressed frames and individually addressed frames are simultaneously transmitted in an HE PPDU transmitted on a plurality of 20-MH channels (i.e., a 40-MHz channel). For example, the AP may transmit a group addressed frame intended for multicast address 1 and a group addressed frame intended for multicast address 2, respectively on first and second subchannels of a first 20-MHz channel, transmit an individually addressed frame intended for STA1 and an individually addressed frame intended for STA2 respectively on third and fourth subchannels of the first 20-MHz channel, and transmit individually addressed frames intended for STA3, STA4, STA5, and STA6 respectively on four subchannels of a second 20-MHz channel.

While an HE-SIG-B field is shown as transmitted after an HE-LTF in the HE PPDU formats illustrated in the examples of FIGS. 20 and 21, the HE PPDU of the present disclosure covers a case in which the HE-SIG-B field is transmitted after an HE-SIG-A field and before an HE-LTF, as illustrated in the example of FIG. 7, 12, or 15.

The HE PPDU may include resource allocation information about a plurality of subchannels. The resource allocation information may include SAS information and subchannel assignment information. For example, the SAS information may include information about a frequency-domain structure of a plurality of subchannels in one 20-MHz channel, and the subchannel assignment information may include information indicating a STA(s) allocated to the subchannels. The resource allocation information may further include information indicating a subchannel including a group addressed frame (i.e., a subchannel allocated for MU-MIMO). As described before with reference to the example of FIG. 11, the resource allocation information may further include information about the number of space streams for a STA allocated to each subchannel. The resource allocation information may be included in an HE-SIG field (e.g., HE-SIG-A or HE-SIG-B). Specific examples of resource allocation information will be described later with reference to FIGS. 25 to 30.

As described before with reference to step S1910 of FIG. 19, the resource allocation information may be configured such that the same STA may not be allocated to different resources redundantly. For example, resource allocation information about a plurality of subchannels in an HE PPDU may not overlap with each other. Specifically, resource allocation information for a STA(s) intended for a subchannel among a plurality of subchannels within a transmission channel of an HE PPDU may not include (i.e., may lack or exclude) resource allocation information for a STA(s) intended for another subchannel. In other words, it may be configured that a STA(s) indicated by resource allocation information about a subchannel of a transmission channel of an HE PPDU is not indicated by (i.e., is lacked in or excluded from) resource allocation information about another subchannel.

In the case where a transmission channel of an HE PPDU is divided into a plurality of subchannels, although one or more STAs may be allocated to one subchannel, only one subchannel may be allocated to one STA.

For example, STAs for which a group addressed frame allocated to a subchannel (or data unit) among a plurality of subchannels of an HE PPDU is intended may be different from STAs for which a group addressed frame allocated to another subchannel (or data unit) of the HE PPDU is intended and a STA for which an individually addressed frame allocated to a third subchannel (or data unit) of the HE PPDU is intended.

Further, a STA for which an individually addressed frame allocated to a subchannel (or data unit) among a plurality of subchannels of an HE PPDU is intended may be different from STAs for which a group addressed frame allocated to another subchannel (or data unit) of the HE PPDU is intended and a STA for which an individually addressed frame allocated to a third subchannel (or data unit) of the HE PPDU is intended.

In the specific example of FIG. 20, it may be configured that the STAs for which the group addressed frame with multicast address 1 is intended are different from STA1, STA2, and the STAs for which the group addressed frame with multicast address 2 is intended.

In the case where a STA is not capable of decoding or is configured not to decode other subchannels than a subchannel allocated to the STA, it may be configured that resource allocation information about a plurality of subchannels does not overlap with each other, as described above. However, this is purely exemplary. Thus, even in the case where a STA is capable of decoding other non-allocated subchannels, it may be also configured that resource allocation information about a plurality of subchannels does not overlap with each other.

Meanwhile, if a STA decodes a whole 20-MHz channel including one or more other subchannels than a subchannel allocated to the STA in an HE PPDU supporting OFDMA, resource allocation information about a plurality of subchannels within the 20-MHz channel may be allowed to overlap with each other. For example, a part or all of the STAs for which a group addressed frame allocated to a subchannel (or data unit) in a 20-MHz channel is intended may be identical to a STA for which an individually addressed frame allocated to another subchannel (or data unit) in the same 20-MHz channel is intended, or a part or all of STAs for which a group addressed frame allocated to a third subchannel (or data unit) in the same 20-MHz channel is intended.

Even in this case, a part or all of the STAs for which a group addressed frame allocated to a subchannel (or data unit) in a 20-MHz channel is intended may be different from a STA for which an individually addressed frame allocated to another subchannel (or data unit) in another 20-MHz channel is intended, or a part or all of STAs for which a group addressed frame allocated to a subchannel (or data unit) in the other 20-MHz channel is intended.

Meanwhile, if a STA decodes another 20-MHz channel in addition to one 20-MHz channel including a subchannel allocated to the STA in an HE PPDU supporting OFDMA (i.e., if the STA decodes the whole transmission channel of the HE PPDU), resource allocation information about a plurality of subchannels within the whole transmission channel may be allowed to overlap with each other. For example, a part or all of the STAs for which a group addressed frame allocated to a subchannel (or data unit) in one 20-MHz channel is intended may be identical to a STA for which an individually addressed frame allocated to another subchannel (or data unit) in the same or different 20-MHz channel is intended, or a part or all of the STAs for which a group addressed frame allocated to a third subchannel (or data unit) in the same or different 20-MHz channel is intended.

Figure 22:
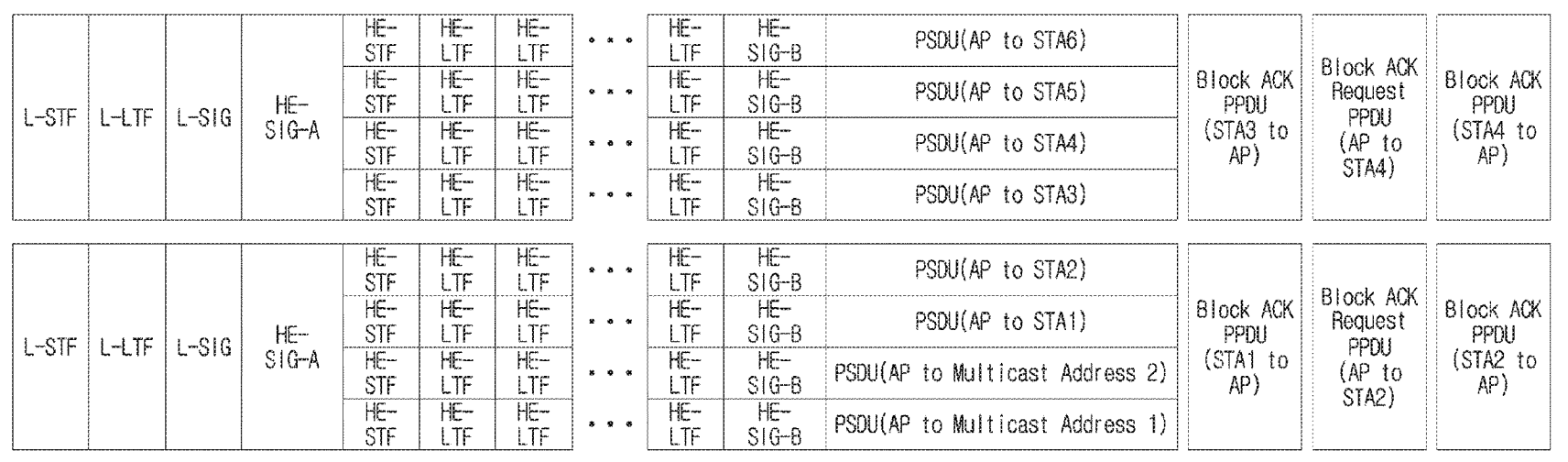
Figure 23:
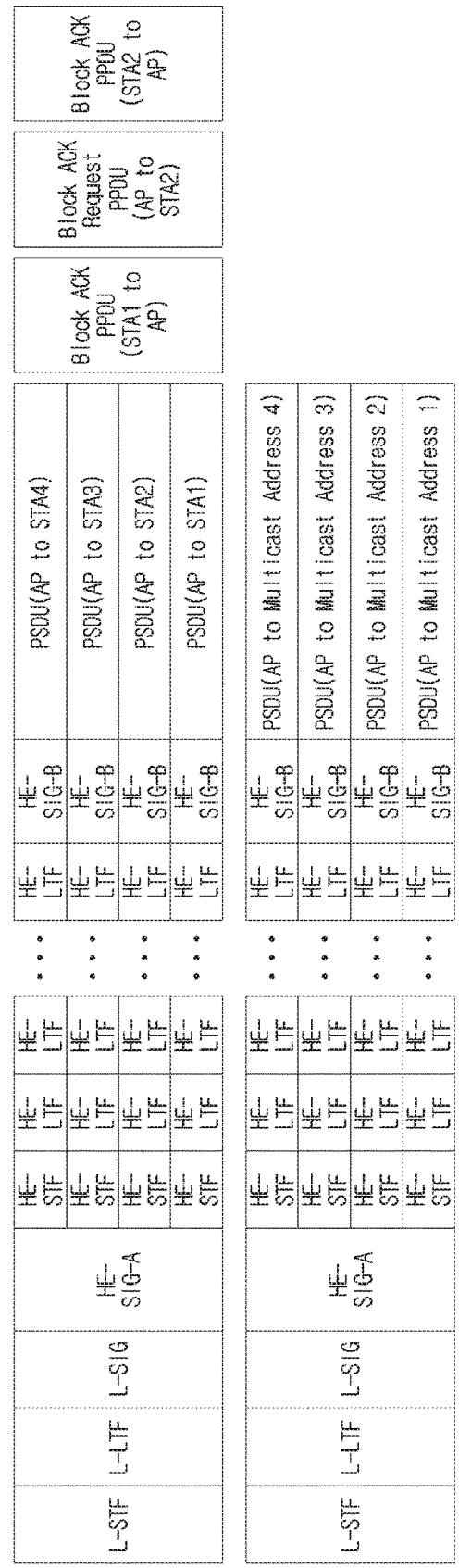
Figure 24:
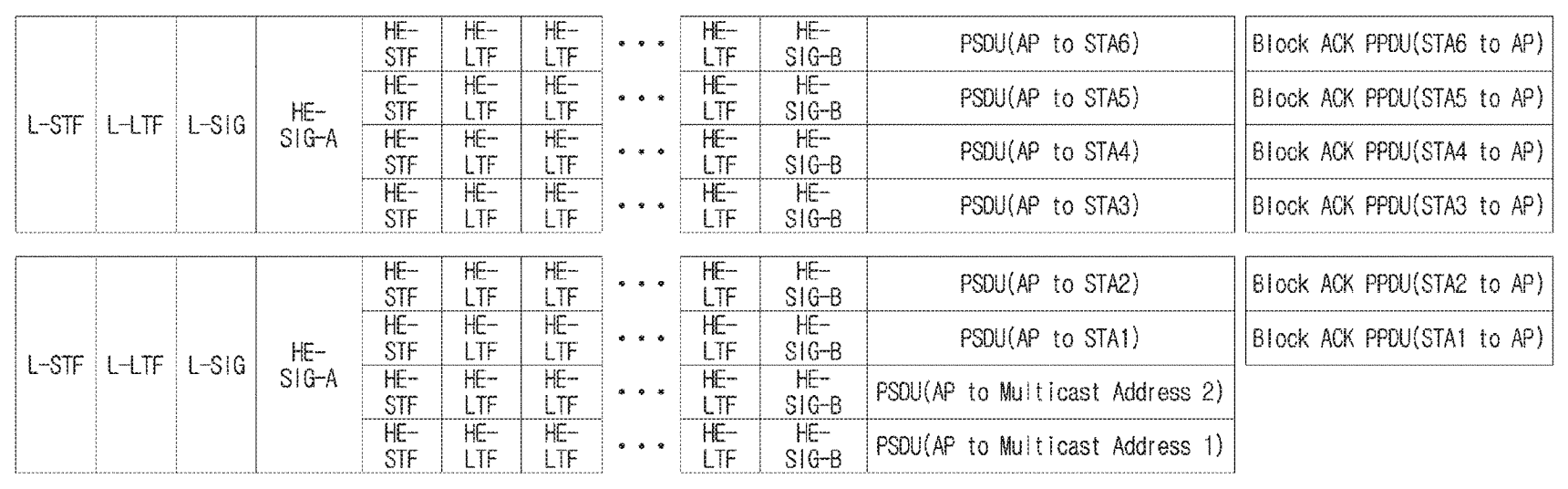

FIGS. 22, 23, and 24 illustrate exemplary frame exchange sequences each including an HE PPDU supporting OFDMA and MU-MIMO according to the present disclosure.

While an HE-SIG-B field is shown as transmitted after an HE-LTF in HE PPDU formats illustrated in the examples of FIGS. 22, 23 and 24, the HE PPDU of the present disclosure covers a case in which the HE-SIG-B field is transmitted after an HE-SIG-A field and before an HE-LTF, as illustrated in the examples of FIG. 7, 12, or 15.

In the frame exchange sequences illustrated in FIGS. 22, 23, and 24, an AP transmits a DL PPDU to one or more STAs and the one or more STAs transmit ACKs to the AP in response to the DL PPDU, by way of example. However, the scope of the present disclosure is not limited thereto. Thus, the present disclosure may include a frame exchange sequence including transmission of a DL PPDU and transmission of a UL PPDU in immediate response to the DL PPDU.

An HE PPDU transmitted on a plurality of 20-MHz channels (e.g., a 40-MHz channel) in FIG. 22 is the same as the HE PPDU illustrated in FIG. 21 and thus will not be described herein to avoid redundancy.

As described before with reference to step S1920 of FIG. 19, a DL HE PPDU may include information triggering or eliciting UL transmission. For example, if a DL HE PPDU transmitted on a 20-MHz channel includes information triggering UL transmission, it may be configured that the UL transmission is performed on the 20-MHz channel carrying the DL HE PPDU, not on another 20-MHz channel.

That is, if the AP transmits a DL HE PPDU to a plurality of STAs on a plurality of 20-MHz channels, the DL HE PPDU may include information triggering UL transmission on each of the 20-MHz channels. The information triggering UL transmission may include an ACK Policy and resource allocation information. Specifically, the AP may not allocate resources for UL transmission in a 20-MHz channel not occupied by the DL HE PPDU including the information triggering UL transmission. That is, the AP may allocate at least one resource for UL transmission in each of the 20-MHz channels occupied by the DL HE PPDU including the information triggering UL transmission.

As illustrated in the example of FIG. 22, for example, information triggering UL transmission (e.g., Block ACK PPDU transmission) from STA1 on a first 20-MHz channel may be included in a DL HE PPDU transmitted on the first 20-MHz channel, and information triggering UL transmission (e.g., Block ACK PPDU transmission) from STA3 on a second 20-MHz channel may be included in a DL HE PPDU transmitted on the second 20-MHz channel.

Specifically, the ACK Policy may be set to No ACK for a group addressed frame and to ACK or Block ACK for an individually addressed frame in the example of FIG. 22. That is, information triggering UL transmission (e.g., ACK or Block ACK transmission) may not be included in the group addressed frame, whereas information triggering UL transmission (e.g., ACK or Block ACK transmission) may be included in the individually addressed frame.

In this case, when the AP transmits an HE PPDU on a plurality of 20-MHz channels, the AP may transmit at least one individually addressed frame (e.g., a frame including information triggering UL transmission) on each of the 20-MHz channels. Accordingly, UL transmission may be performed on each of the 20-MHz channels in immediate response to the DL HE PPDU.

Meanwhile, FIG. 23 illustrates an example in which information triggering UL transmission is not transmitted on a first of a plurality of 20-MHz channels, whereas information triggering UL transmission is transmitted on a second of the 20-MHz channels. Specifically, only group addressed frames each with an ACK Policy set to No ACK may be transmitted on the first 20-MHz channel, and individually addressed frames each with an ACK Policy set to ACK or Block ACK may be transmitted on the second 20-MHz channel.

In this case, since a DL HE PPDU including information triggering UL transmission is not transmitted on the first 20-MHz channel (i.e., even though the first 20-MHz channel carries a DL HE PPDU, the DL HE PPDU does not include information triggering UL transmission), one or more STAs receiving the DL HE PPDU may determine that no resources of the first 20-MHz channel are allocated for UL transmission and thus may not perform UL transmission on the first 20-MHz channel. On the other hand, since the second 20-MHz channel carries a DL HE PPDU including information triggering UL transmission, one or more STAs receiving the DL HE PPDU may perform UL transmission on the second 20-MHz channel, determining that at least one resource of the second 20-MHz channel is allocated for UL transmission.

As described above, in the case where UL transmission is performed on a part of the whole transmission channel of a DL HE PPDU, transmission from another STA may be performed on the other channel not occupied by UL transmission. In this case, when the AP transmits an additional DL HE PPDU, the transmission bandwidth of the additional DL HE PPDU may be reduced to a bandwidth smaller than the transmission channel bandwidth of the previous DL HE PPDU (e.g., equal to or smaller than a channel bandwidth in which UL transmission triggered by the previous DL HE PPDU has been performed).

It is assumed in the foregoing examples that the ACK Policy is set to No ACK for a group addressed frame and to ACK or Block ACK for an individually addressed frame, which should not be construed as limiting the present disclosure. Thus, even though the ACK Policy is set to No ACK for an individually addressed frame, UL transmission may not be performed on a 20-MHz channel, as illustrated in FIG. 23. For example, if the ACK Policy is set to No ACK for both the group addressed frame intended for STA1 and the initially addressed frame intended for STA2 on the first 20-MHz channel in the example of FIG. 22, UL transmission may not be performed on the first 20-MHz channel.

To prevent this problem, if information triggering UL transmission is included in a subchannel (or data unit) and information triggering UL transmission is not included in another subchannel (or data unit) in a DL HE PPDU transmitted on a plurality of 20-MHz channels, information triggering at least one UL transmission on each of the 20-MHz channels may be included in the DL HE PPDU.

For example, the AP may include both a frame with an ACK Policy set to No ACK and a frame with an ACK Policy set to a value other than No ACK in a DL HE PPDU transmitted on a plurality of 20-MHz channels, thus, at least one frame with an ACK Policy set to a value other than No ACK for each of the 20-MHz channels may be included in the DL HE PPDU.

In the frame exchange sequences illustrated in the examples of FIGS. 22 and 23, a control response frame such as an ACK PPDU may be triggered or requested only when a channel including a primary channel (refer to FIGS. 16 and 17) is available. In the case where a control response frame may not be requested for a 20-MHz channel, a control response frame may be requested for another 20-MHz channel only when a primary 20-MHz channel, a primary 40-MHz channel, a primary 80-MHz channel, and a 160-MHz channel are available to the control response frame.

Specifically, if the first 20-MHz channel is a primary 20-MHz channel and the second 20-MHz channel is a secondary 20-MHz channel in the example of FIG. 23, it may not be allowed to perform an operation for transmitting a control response frame only on the second 20-MHz channel, not transmitting a control response frame on the first 20-MHz channel, as illustrated in FIG. 23. On the other hand, if the first 20-MHz channel is the secondary 20-MHz channel and the second 20-MHz channel is the primary 20-MHz channel in the example of FIG. 23, it may be allowed to perform an operation for transmitting a control response frame only on the second 20-MHz channel, not transmitting a control response frame on the first 20-MHz channel, as illustrated in FIG. 23.

In the example of FIG. 24, it is possible to perform UL transmission triggered by a DL HE PPDU on a subchannel basis.

For example, if it is assumed in the example of FIG. 24 that information triggering UL transmission (e.g., ACK or Block ACK transmission) is not included in a group addressed frame and information triggering UL transmission (e.g., ACK or Block ACK transmission) is included in an individually addressed frame, individually addressed frames may be transmitted on a part of the subchannels of a first 20-MHz channel and on all of the subchannels of a second 20-MHz channel. In this case, UL transmission triggered by a frame including information triggering the UL transmission may be performed on a subchannel carrying the frame.

As described above, if a DL HE PPDU including information triggering UL transmission is transmitted on each 20-MHz channel, at least one subchannel of the 20-MHz channel may be allocated for UL transmission. That is, if a DL HE PPDU including information triggering UL transmission is not transmitted on a 20-MHz channel, no subchannel of the 20-MHz channel may be allocated for UL transmission.

If a control response frame may be transmitted on a subchannel basis in response to the DL HE PPDU, a transmission bandwidth of a control response frame on a 20-MHz channel may be set to be equal to or larger than a predetermined bandwidth. The predetermined bandwidth may be set to a minimum value by which a third-party STA detects the channel to be busy, when determining whether the channel is busy or idle based on energy detection or non-detection during CCA. Further, the predetermined bandwidth may be determined according to the number of subchannels, N, and a ratio between one channel bandwidth and a bandwidth of a subchannel(s) in consideration of a subchannel allocation structure.

FIGS. 25 to 30 depict exemplary configurations of resource allocation information in an HE PPDU format supporting OFDMA and MU-MIMO according to the present disclosure.

Each of the HE PPDU formats includes all of HE-SIG-A, HE-SIG-B, and HE-SIG-C fields in the examples of FIGS. 25 to 30, to which the present disclosure is not limited. The present disclosure also covers a case in which an HE PPDU includes only an HE-SIG-A field or only HE-SIG-A and HE-SIG-B fields. In the following description, information (particularly, information related to resource allocation) described as included separately in the HE-SIG-A, HE-SIG-B, and HE-SIG-C fields may be merged in the HE-SIG-A field or the HE-SIG-B field. Or some of the information may be included in the HE-SIG-A field and the other information may be included in the HE-SIG-B field. That is, the examples of the present disclosure are not limited to the names HE-SIG-A, HE-SIG-B, and HE-SIG-C, just providing specific examples of information related to resource allocation included in an HE-SIG field. Accordingly, the following description is given with the appreciation that HE-SIG-A, HE-SIG-B, and HE-SIG-C may be collectively referred to as HE-SIG and HE-SIG may be branched into a first HE-SIG and a second HE-SIG. However, the first HE-SIG and the second HE-SIG may not be necessarily distinguished in the time domain. Rather, the first HE-SIG and the second HE-SIG may be distinguished logically.

Information about frequency resources (e.g., a subchannel) allocated to each of a plurality of STAs may be included in an HE-SIG of an HE PPDU format supporting OFDMA and MU-MIMO. The information about frequency resources may include SAS information and subchannel assignment information. The SAS information specifies how a plurality of subchannels are configured in the frequency domain in one 20-MHz channel. The SAS information may be referred to as subchannel arrangement information, resource unit allocation information, or resource unit arrangement information. The subchannel assignment information indicates what user (or STA) is allocated to what subchannel (or resource unit). The subchannel assignment information may be referred to as resource unit assignment information.

The resource allocation information may further include information indicating a subchannel including a group addressed frame (i.e., a subchannel allocated for MU-MIMO) (i.e., information indicating a subchannel (or resource unit) allocated for MU-MIMO).

Also, the resource allocation information may further include spatial resource configuration information (e.g., information about the number of space streams) for a STA allocated to each subchannel.

The above-described SAS information, subchannel assignment information, MU-MIMO allocation subchannel indication information, and spatial resource configuration information may be included in the HE-SIG. For example, one or more of the SAS information and the MU-MIMO allocation subchannel indication information may be included in the first HE-SIG, and one or more of the subchannel assignment information and the spatial resource configuration information may be included in the second HE-SIG. However, the types of resource allocation information included in the first HE-SIG and the second HE-SIG are not limited to the above specific types.

The SAS information may indicate subchannel bandwidth units of various sizes. For example, in the case where information indicating the size of a subchannel bandwidth unit is 3 bits long, if the information is 0, it may indicate 5 MHz, if the information is 1, it may indicate 10 MHz, if the information is 2, it may indicate 20 MHz, if the information is 3, it may indicate 40 MHz, if the information is 4, it may indicate 80 MHz, and if the information is 5, it may indicate 160 MHz. To represent a subchannel allocation structure for allocating subchannels on the basis of a minimum subchannel bandwidth of 5 MHz by the SAS information, 32 pieces of 3-bit information indicating the size of a subchannel bandwidth unit are needed and thus the SAS information needs to be up to 96 bits long. However, the SAS information may be configured independently or individually for each 20-MHz channel in order to reduce the signaling overhead of the SAS information. That is, if SAS information for different 20-MHz channels is configured to allow different subchannel bandwidth units, 4 pieces of 3-bit information indicating the size of a subchannel bandwidth unit are needed to represent the subchannel allocation structure for allocating a subchannel on the basis of the minimum subchannel bandwidth, 5 MHz, and thus the SAS information needs to be 12 bits long. Accordingly, up to 12-bit SAS information is required for each 20-MHz channel even in the case of the maximum transmission channel bandwidth, 160 MHz.

As in the example of FIG. 25, resource allocation information may include SAS information for each 20-MHz channel in an HE PPDU transmitted on a 40-MHz transmission channel. If the SAS information for the first 20-MHz channel is {0, 0, 1}, this indicates that first, second, and third subchannels have respective subchannel bandwidths of 5 MHz, 5 MHz, and 10 MHz. If the SAS information for the second 20-MHz channel is {0, 0, 0, 0}, this indicates that first, second, third, and fourth subchannels have respective subchannel bandwidths of 5 MHz, 5 MHz, 5 MHz, and 5 MHz.

When each of the plurality of STAs checks the subchannel allocation structure of each 20-MHz channel based on the SAS information included in the first HE-SIG, the STA may determine a subchannel allocated to the STA based on the subchannel assignment information included in the second HE-SIG.

In the example of FIG. 25, upon receipt of an HE PPDU transmitted on a 40-MHz transmission channel, a STA may receive an HE-STF, an HE-LTF, and an HE-SIG-B on each of subchannels having 5 MHz, 5 MHz, 10 MHz, 5 MHz, 5

MHz, 5 MHz, and 5 MHz, respectively, determine a destination STA for each subchannel (i.e., information identifying a target STA for resource allocation), and thus determine a subchannel to be received. While SAS information is included in an HE-SIG-A and subchannel assignment information is included in an HE-SIG-B in the examples of FIGS. 25 to 30, by way of example, this does not limit the present disclosure.

The subchannel assignment information may include identification information (STA-ID information) about a STA allocated to a subchannel. The STA-ID information may be configured using an AID, a Partial AID, or a Group ID. Upon receipt of the subchannel assignment information, a STA may determine whether the STA is a destination STA (i.e., a target STA for resource allocation) for the subchannel by checking whether the STA-ID information matches identification information about the STA.

Figure 26:
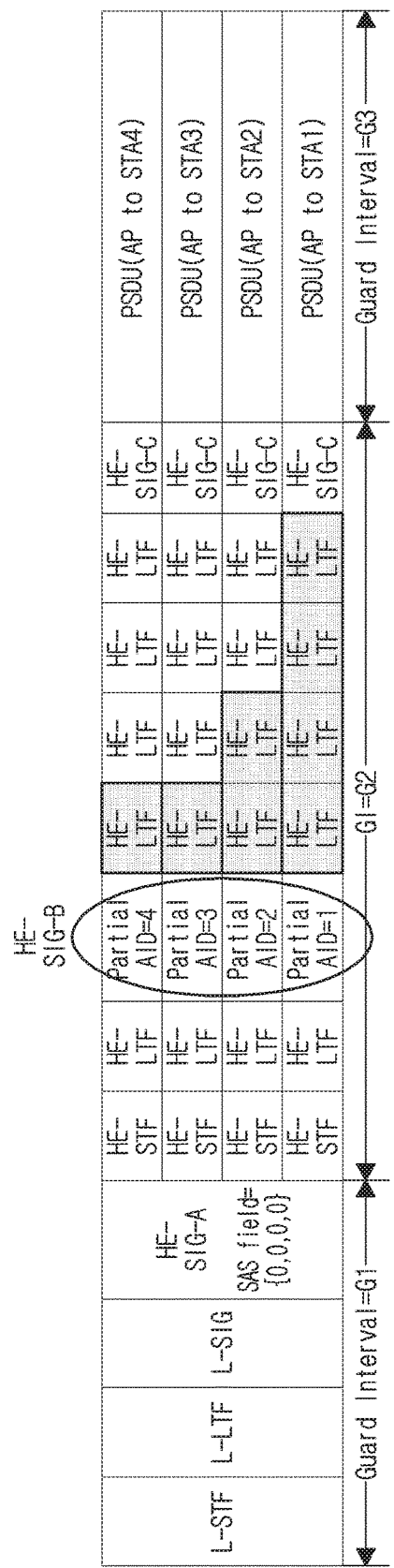

The example of FIG. 26 illustrates a case in which a 20-MHz transmission channel of an HE PPDU is divided into four 5-MHz channels and STA-ID information allocated to each subchannel is Partial AID information. Subchannel assignment information including the STA-ID information (e.g., PAID information) may be included in a second HE-SIG or an HE-SIG-B.

The example of FIG. 26 corresponds to a case in which an individually addressed frame (unicast frame or SU frame) is transmitted on each of a plurality of subchannels in an HE PPDU.

If Partial AID information about STAs allocated to the four 5-MHz subchannels indicate 1, 2, 3, and 4, respectively, and the Partial AID values of STA1, STA2, STA3, and STA4 are 1, 2, 3, and 4, respectively, each STA may receive a data unit (e.g., PSDU) on a subchannel to which a Partial AID matching the PAID of the STA is allocated in FIG. 26.

Figure 27:
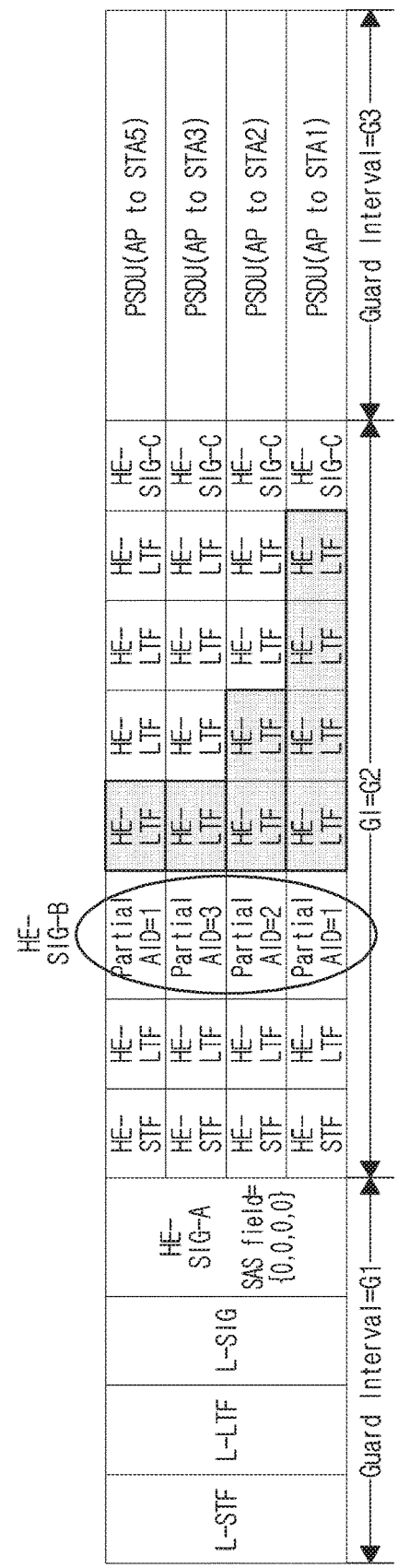

The example of FIG. 27 illustrates a case in which although an individually addressed frame is transmitted on each of a plurality of subchannels in an HE PPDU as in the example of FIG. 26, STA-ID information, that is, Partial AID information allocated to the subchannels overlap with each other unlike the example of FIG. 26. That is, since Partial AIDs are non-unique STA IDs, there may be STAs having the same Partial AID among the destination STAs of the HE PPDU (i.e., target STAs for resource allocation).

If Partial AID information about STAs allocated to the four 5-MHz subchannels indicate 1, 2, 3, and 1, respectively and the Partial AID values of STA1, STA2, STA3, STA4, and STA5 are 1, 2, 3, 4, and 1, respectively, each of STA2 and STA3 may receive a data unit (e.g., PSDU) on a subchannel to which a Partial AID matching the Partial AID of the STA is allocated in FIG. 27. On the other hand, since there are a plurality of subchannels to which a Partial AID matching the Partial AID of each of STA1 and STA5 is allocated, STA1 and STA5 may not determine a subchannel on which to receive data units (e.g., PSDUs). That is, although the AP has transmitted PSDUs to different STAs on different subchannels, if the different STAs have the same Partial AID, the STAs may not determine what subchannels to receive.

Accordingly, if Partial AID information is used as STA-ID information included in subchannel assignment information, it may be configured that target STAs for resource allocation do not include STAs having the same Partial AID. That is, similar to the description given with reference to FIGS. 20 and 21, resource allocation information for a STA(s) intended for a subchannel among a plurality of subchannels within a transmission channel of an HE PPDU may not include resource allocation information for a STA(s) intended for another subchannel. Specifically, similar to the description given with reference to FIGS. 20 and 21, it may be configured that subchannel assignment information for a STA(s) intended for a subchannel among a plurality of subchannels within a transmission channel of an HE PPDU may be configured to be different from subchannel assignment information for a STA(s) intended for another subchannel.

In this manner, it may be configured that resource allocation information for one STA among target STAs of an HE PPDU (i.e., target STAs for resource allocation) allocates only one subchannel to the STA. If one Partial AID corresponds to the AIDs of a plurality of STAs, it may be configured that subchannels are not simultaneously allocated to the Partial AID or a subchannel is allocated to only one of the STAs corresponding to the Partial AID. In the example of FIG. 27, Partial AID 1 corresponding to the AIDs of STA1 and STA5 may be used as a STA-ID of subchannel assignment information only for one STA (e.g., one of STA1 and STA5) in the example of FIG. 27.

For example, it may be configured that the AP assigns only a first subchannel, not any other subchannel, to Partial AID 1 so as to transmit a PSDU to STA1 on the first subchannel. Meanwhile, while STA5 may attempt to receive a PSDU on the first subchannel to which Partial AID 1 is assigned, STA5 may be aware that STA5 is not a destination STA of the PSDU by checking the RA field of the MAC header of the PSDU.

Figure 28:
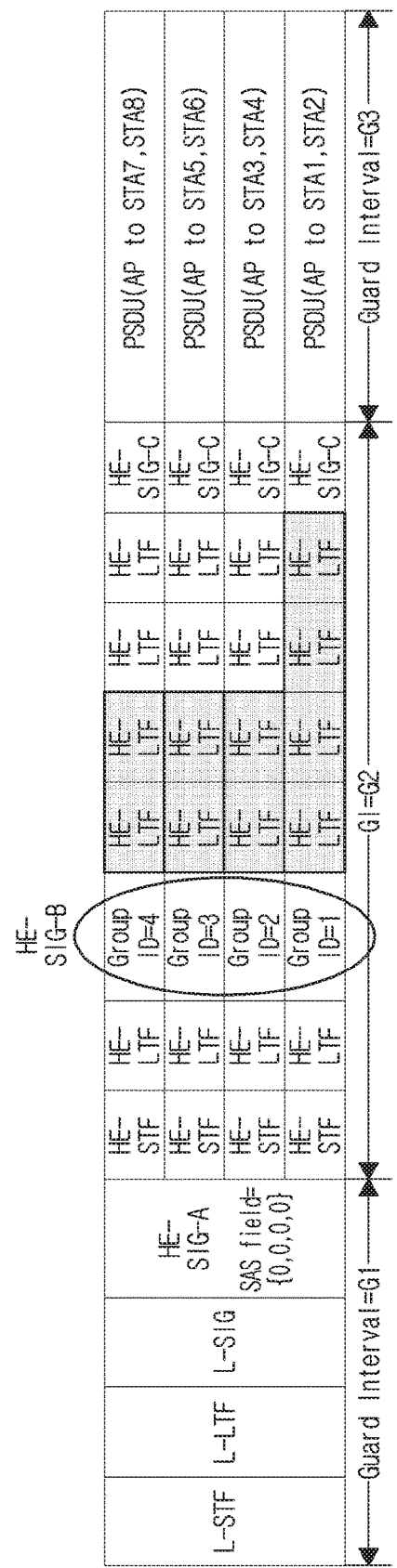

The example of FIG. 28 illustrates a case in which a 20-MHz transmission channel of an HE PPDU is divided into four 5-MHz subchannels, where STA-ID information assigned to each subchannel is Group ID information. Subchannel assignment information including the STA-ID information (e.g., the Group ID information) may be included in a second HE-SIG or an HE-SIG-B.

The example of FIG. 28 corresponds to a case in which a group addressed frame (a multicast/broadcast frame or an MU-MIMO frame) is transmitted on each of a plurality of subchannels in an HE PPDU.

It is assumed in FIG. 28 that Group ID information assigned to the four 5-MHz subchannels indicate 1, 2, 3, and 4, respectively, STA1 and STA2 have membership of Group ID 1, STA3 and STA4 have membership of Group ID 2, STA5 and STA6 have membership of Group ID 3, and STAT and STA8 have membership of Group ID 4. In this case, each STA may receive a data unit (e.g., PSDU) on a subchannel assigned to a Group ID of which the STA has membership by comparing the membership status of the Group ID of the STA with the STA-ID information (i.e., Group ID information) of the subchannel assignment information included in the HE PPDU.

Figure 29:
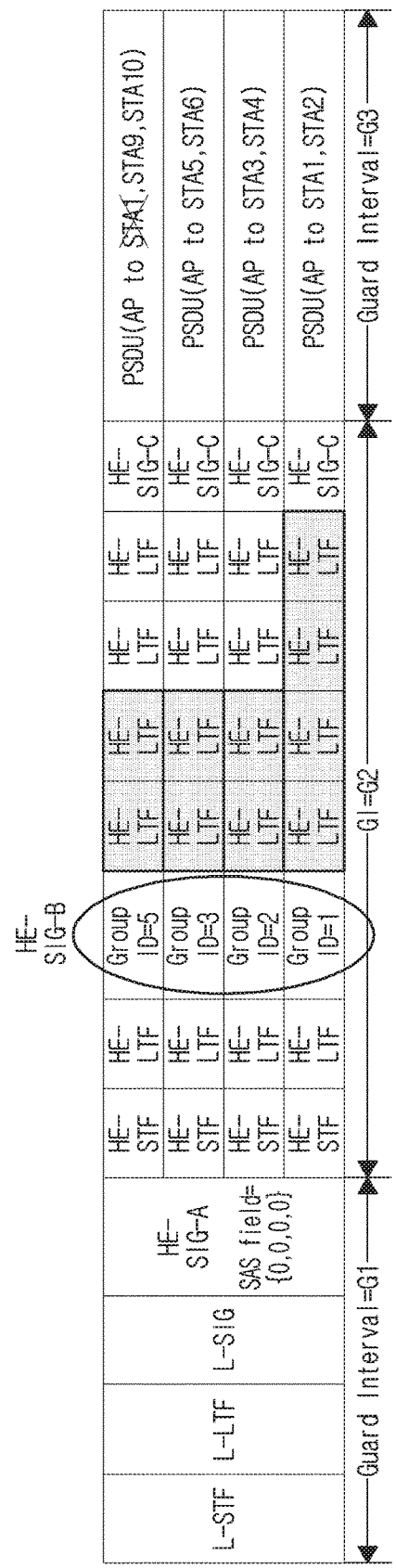

The example of FIG. 29 illustrates a case in which although a group addressed frame is transmitted on each of a plurality of subchannels in an HE PPDU as in the example of FIG. 28, STA-ID information, that is, Group ID information assigned to the subchannels overlap with each other unlike the example of FIG. 28. That is, since one STA may have membership of a plurality of groups, there may be a STA(s) having membership of different Group IDs among destination STAs of the HE PPDU (i.e., target STAs for resource allocation).

If Group ID information about STAs assigned to the four 5-MHz subchannels indicate 1, 2, 3, and 5, respectively, STA1 has membership of Group ID 1 and Group ID 5, STA2 has membership of Group ID 1, STA3 and STA4 have membership of Group ID 2, STA5 and STA6 have membership of Group ID 3, and STA9 and STA10 have membership of Group ID 5. Meanwhile, it is assumed that the AP has transmitted a group addressed frame (i.e., an MU-MIMO frame) to STA9 and STA10 except for STA1 among the STAs having membership of Group ID 5.

In this case, each of STA2, STA3, STA4, STA5, STA6, STA9, and STA10 may receive a data unit (e.g., a PSDU) on a subchannel assigned to a Group ID of which the STA has membership by comparing the membership status of the Group ID of the STA with the STA-ID information (i.e. Group ID information) of the subchannel assignment information included in the HE PPDU. On the other hand, since there are a plurality of subchannels assigned to the Group IDs of which STA1 has membership, STA1 may not determine a subchannel on which to receive a data unit (i.e., a PSDU). That is, although the AP has transmitted PSDUs to STAs belonging to different Group IDs on different subchannels, a STA having membership of a plurality of Group IDs may not determine what subchannel to receive.

Accordingly, in the case where Group ID information is used as STA-ID information included in subchannel assignment information, it may be configured that a plurality of Group IDs of which one STA has membership are not included as identification information identifying destination STAs of an HE PPDU (i.e., target STAs for resource allocation). That is, similar to the description given with reference to FIGS. 20 and 21, resource allocation information for a STA(s) intended for a subchannel among a plurality of subchannels within a transmission channel of an HE PPDU may not include resource allocation information for a STA(s) intended for another subchannel. Specifically, similar to the description given with reference to FIGS. 20 and 21, it may be configured that subchannel assignment information for a STA(s) intended for a subchannel among a plurality of subchannels within a transmission channel of an HE PPDU is different from subchannel assignment information for a STA(s) intended for another subchannel.

In this manner, it may be configured that resource allocation information for one STA among target STAs of an HE PPDU (i.e., target STAs for resource allocation) allocates only one subchannel to the STA. If one STA has membership of a plurality of Group IDs, it may be configured that subchannels are not simultaneously assigned to the Group IDs. For example, a subchannel may be assigned only for one of the plurality of Group IDs of which the STA has membership. In the example of FIG. 29, Group ID 1 and Group ID 5 may not be used simultaneously as STA-IDs of subchannel assignment information (e.g., only one of Group ID 1 and Group ID 5 may be used as a STA-ID of the subchannel assignment information).

Figure 30:
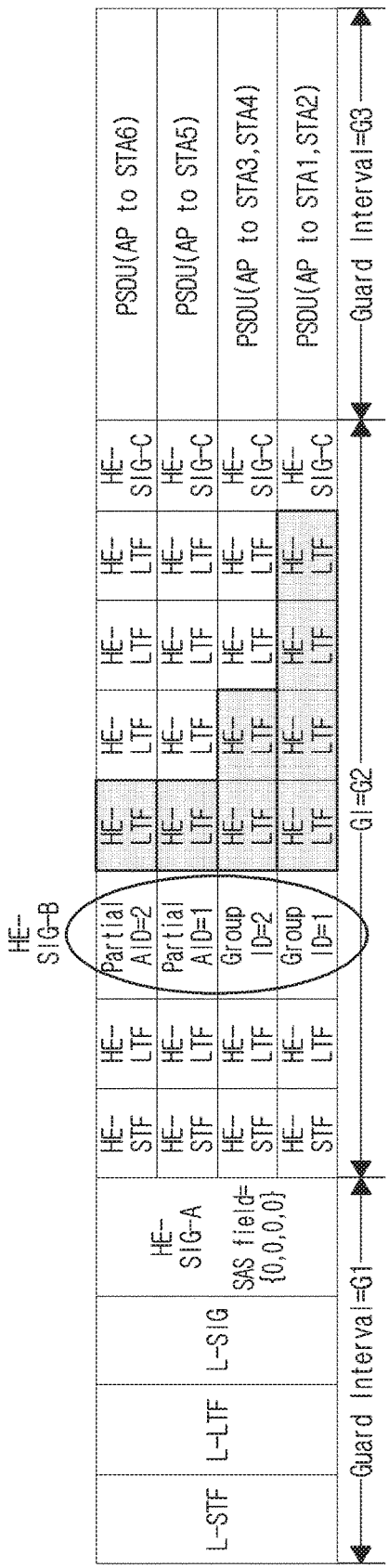

The example of FIG. 30 corresponds to a case in which an individually addressed frame (a unicast frame or an SU frame) is transmitted on each of a part of a plurality of subchannels and a group addressed frame (a multicast/broadcast frame or an MU-MIMO frame) is transmitted on each of another part of the plurality of subchannels in an HE PPDU.

The example of FIG. 30 corresponds to a case in which an individually addressed frame (a unicast frame or an SU frame) is transmitted on each of a part of a plurality of subchannels and a group addressed frame (a multicast/broadcast frame or an MU-MIMO frame) is transmitted on each of another part of the plurality of subchannels, in an HE PPDU.

In the example of FIG. 30, it is assumed that Group ID information for STAs assigned to the first and second subchannels is 1 and 2, respectively, and Partial AID information for STAs assigned to third and fourth subchannels is 1 and 2 respectively. That is, the example of FIG. 30 corresponds to a case in which a group addressed frame is transmitted on each of the first and second of four 5-MHz subchannels and an individually addressed frame is transmitted on each of the third and fourth of the four 5-MHz subchannels.

It is also assumed in the example of FIG. 30 that STA1 and STA2 have membership of Group ID 1, and STA3 and STA4 have membership of Group ID 2. It is assumed that the Partial AID values of STA1, STA2, STA3, STA4, STA5, and STA6 are 1, 2, 3, 4, 1, and 2, respectively.

In this case, each of STA3 and STA4 may receive a data unit (e.g., PSDU) on a subchannel assigned to a Group ID of which the STA has membership by comparing the membership status of the Group ID of the STA with STA-ID information (i.e., Group ID information) of subchannel assignment information included in an HE PPDU. Further, each of STA5 and STA6 may receive a data unit (e.g., PSDU) on a subchannel to which a Partial AID matching the Partial AID of the STA is assigned.

Meanwhile, since the Partial AID of STA1 is 1, STA1 may determine that the third subchannel is assigned to STA1. That is, STA1 may determine that the first subchannel is assigned to STA1 based on the Group ID information and may determine that the third subchannel is assigned to STA1 based on the Partial AID information.

Similarly, since the Partial AID of STA2 is 2, STA2 may determine that the fourth subchannel is also assigned to STA2. That is, STA2 may determine that the first subchannel is assigned to STA2 based on the Group ID information and may determine that the fourth subchannel is assigned to STA2 based on the Partial AID information.

For each of STA1 and STA2, there are both a subchannel assigned to a Group ID of which the STA has membership and a subchannel assigned to its Partial AID, as described above. Therefore, the STA may not determine a subchannel on which to receive a data unit (e.g., a PSDU). That is, although the AP has transmitted PSDUs to different STAs or STA groups on different subchannels, a STA having a Group ID and a Partial AID assigned to different subchannels may not determine a subchannel to be received.

Accordingly, if Group ID information and Partial AID information are used as STA-ID information included in subchannel assignment information, it may be configured that a Group ID of which a STA with a Partial AID matching Partial AID information included in the subchannel assignment information has membership is not included as identification information identifying a destination STA of an HE PPDU (i.e., a target STA for resource allocation). Or if Group ID information and Partial AID information are used as STA-ID information included in subchannel assignment information, it may be configured that the Partial AID of a STA having membership of a group corresponding to a Group ID included in the subchannel assignment information is not included as identification information identifying a destination STA of an HE PPDU (i.e., a target STA for resource allocation). That is, similar to the description given with reference to FIGS. 20 and 21, resource allocation information for a STA(s) intended for a subchannel among a plurality of subchannels within a transmission channel of an HE PPDU may not include resource allocation information for a STA(s) intended for another subchannel. Specifically, similar to the description given with reference to FIGS. 20 and 21, subchannel assignment information for a STA(s) intended for a subchannel among a plurality of subchannels within a transmission channel of an HE PPDU may be configured to be different from subchannel assignment information for a STA(s) intended for another subchannel.

As described above, resource allocation information for one of the destination STAs of an HE PPDU (i.e., target STAs for resource allocation) may be configured so as to allocate only one subchannel to the STA. If a STA has membership of a Group ID, it may be configured that different subchannels are not assigned to the Group ID and the Partial AID of the STA. If STA1 having Partial AID 1 has membership of Group ID 1 in the example of FIG. 30, it may be configured that Partial AID 1 and Group ID 1 are not assigned simultaneously to different subchannels (i.e., only one of Partial AID 1 and Group ID 1 is assigned to one subchannel). Similarly, if STA2 having Partial AID 2 has membership of Group ID 1, it may be configured that Partial AID 2 and Group ID 1 are not assigned simultaneously to different subchannels (i.e., only one of Partial AID 2 and Group ID 1 is assigned to one subchannel).

While the afore-described exemplary methods of the present disclosure have been described as a series of operations for simplicity of description, this does not limit the sequence of steps. In some embodiments, steps may be performed at the same time or in a different sequence. All of the exemplary steps are not always necessary to implement the method proposed by the present disclosure.

The foregoing embodiments of the present disclosure may be implemented separately or combinations of two or more of the embodiments may be implemented simultaneously, for the afore-described exemplary methods of the present disclosure.

The present disclosure includes an apparatus for processing or performing the method of the present disclosure (e.g., the wireless device and its components described with reference to FIGS. 1, 2, and 3).

The present disclosure includes software or machine-executable instructions (e.g., an operating system (OS), an application, firmware, a program, etc.) for executing the method of the present disclosure in a device or a computer, and a non-transitory computer-readable medium storing the software or instructions that can be executed in a device or a computer.

While various embodiments of the present disclosure have been described in the context of an IEEE 802.11 system, they are applicable to various mobile communication systems.

What is claimed is:

1. A method by an access point (AP) in a wireless network for transmitting a Physical layer Protocol Data Unit (PPDU) to a plurality of stations (STAs), the method comprising:
    generating resource allocation information intended for the plurality of STAs, wherein the resource allocation information intended for the plurality of STAs includes subchannel allocation structure information that specifies subchannel structure in a frequency domain per 20 MHz channel and subchannel assignment information that specifies which STAs are allocated to which subchannels specified by the subchannel allocation structure information;
    generating a preamble including a High-Efficiency SIGNAL (HE-SIG) field, an HE-Short Training Field (HE-STF) field and an HE-Long Training Field (HE-LTF) field, wherein the HE-SIG field includes an HE-SIG-A field and an HE-SIG-B field, wherein the HE-SIG-A field includes the subchannel allocation structure information and the HE-SIG-B field includes the subchannel assignment information, wherein the subchannel allocation structure information included in the HE-SIG-A field indicates a subchannel bandwidth size of each of one or more subchannels into which a 20 MHz channel is divided using a value, wherein the value being set to 0 indicates a subchannel bandwidth size of 5 MHz and the value being set to 1 indicates a subchannel bandwidth size of 10 MHz;
    generating an individually addressed frame;
    generating a group addressed frame including a multicast address, wherein STAs for which the group addressed frame is intended do not overlap with a STA for which the individually addressed frame is intended;
    allocating, for the group addressed frame, a first subchannel among a plurality of subchannels into which a transmission channel is divided;
    allocating, for the individually addressed frame, a second subchannel among the plurality of subchannels, wherein the second subchannel is different from the first subchannel;
    transmitting the preamble to the plurality of STAs; and
    transmitting, on the transmission channel, a data field following the preamble, wherein the data field includes the group addressed frame transmitted in the first subchannel and the individually addressed frame transmitted in the second subchannel.

2. The method according to claim 1, wherein the resource allocation information intended for the plurality of STAs includes resource allocation information of the STAs for which the group addressed frame is intended and resource allocation information of the STA for which the individually addressed frame is intended,
    wherein the resource allocation information of the STAs for which the group addressed frame is intended indicates the first subchannel, and
    wherein the resource allocation information of the STA for which the individually addressed frame is intended indicates the second subchannel.

3. The method according to claim 1, wherein the resource allocation information intended for the plurality of STAs further includes information indicating whether a subchannel is allocated for Multiple User-Multiple Inputs and Multiple Outputs (MU-MIMO).

4. The method according to claim 3, wherein the resource allocation information intended for the plurality of STAs further includes information on a number of spatial streams used for one or more STAs assigned to a subchannel.

5. The method according to claim 4, wherein the resource allocation information further includes information on a modulation and coding scheme (MCS) used for a subchannel.

6. The method according to claim 5, wherein the resource allocation information includes resource allocation information per 20 MHz channel.

7. The method according to claim 1, wherein the PPDU includes information eliciting uplink transmission from one or more of the plurality of STAs to the AP.

8. The method according to claim 7, wherein the transmission channel includes a plurality of 20 MHz channels, and
    uplink transmission by one or more STAs of the plurality of STAs is performed in a 20 MHz channel on which at least one data unit including the information eliciting uplink transmission is transmitted.

9. The method according to claim 8, wherein the uplink transmission by the one or more STAs is performed on at least one subchannel in the 20 MHz channel on which the information eliciting uplink transmission is transmitted, and the at least one subchannel is allocated by the information eliciting uplink transmission.

10. A method by a first station (STA) in a wireless network for receiving a Physical layer Protocol Data Unit (PPDU) from an access point (AP), the method comprising:

receiving, from the AP, a preamble including a High-Efficiency SIGNAL (HE-SIG) field that includes an HE-SIG-A field and an HE-SIG-B field, an HE-Short Training Field (HE-STF) field and an HE-Long Training Field (HE-LTF) field in the PPDU on a transmission channel, wherein the HE-SIG field includes resource allocation information intended for a plurality of STAs including the first STA, wherein the resource allocation information intended for the plurality of STAs includes subchannel allocation structure information that specifies subchannel structure in a frequency domain per 20 MHz channel and subchannel assignment information that specifies which STAs are allocated to which subchannels specified by the subchannel allocation structure information, wherein the HE-SIG-A field includes the subchannel allocation structure information, wherein the HE-SIG-B field includes the subchannel assignment information, wherein the subchannel allocation structure information included in the HE-SIG-A field indicates a subchannel bandwidth size of each of one or more subchannels into which a 20 MHz channel is divided using a value, wherein the value being set to 0 indicates a subchannel bandwidth size of 5 MHz and the value being set to 1 indicates a subchannel bandwidth size of 10 MHz;

receiving, from the AP, a data field following the preamble, wherein the data field includes a group addressed frame including a multicast address and an individually addressed frame, wherein the group addressed frame including the multicast address is allocated and transmitted in a first subchannel among a plurality of subchannels into which the transmission channel is divided, wherein the individually addressed frame is allocated and transmitted in a second subchannel among the plurality of subchannels, wherein the second subchannel is different from the first subchannel, and wherein multiple STAs for which the group addressed frame is intended do not overlap with a single STA for which the individually addressed frame is intended;

determining which of the group addressed frame or the individually addressed frame is intended for the first STA based on the subchannel allocation structure information included in the HE-SIG-A field and the subchannel assignment information included in the HE-SIG-B field; and decoding one of the group addressed frame or the individually addressed frame based on which of the group addressed frame or the individually addressed frame is intended for the first STA.

* * * * *